United States Patent
Yang et al.

(10) Patent No.: US 11,838,227 B2
(45) Date of Patent: Dec. 5, 2023

(54) PILOT TONES IN DISTRIBUTED RESOURCE UNIT (DRU) TRANSMISSION

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US); Qifan Chen, Newark, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/390,828

(22) Filed: Jul. 30, 2021

(65) Prior Publication Data
US 2023/0048884 A1     Feb. 16, 2023

(51) Int. Cl.
*H04L 5/00* (2006.01)
(52) U.S. Cl.
CPC .......... *H04L 5/0044* (2013.01); *H04L 5/0048* (2013.01)
(58) Field of Classification Search
CPC ... H04L 5/0044; H04L 5/0048; H04L 5/0094; H04L 5/0057; H04L 5/0042;
(Continued)

(56) References Cited

U.S. PATENT DOCUMENTS

2017/0288838 A1* 10/2017 Cariou ................. H04L 5/0057
2020/0178216 A1* 6/2020 Huang ................. H04L 1/0003
(Continued)

FOREIGN PATENT DOCUMENTS

CN     107113132 A  *  8/2017
CN     106233777 B  *  2/2020  ......... H04L 27/2602
(Continued)

OTHER PUBLICATIONS

IEEE 802.16m-08/005, "Call for Contributions on Project 802.16m System Description Document (SDD)"; "Downlink Physical Resource Allocation Unit", "Pilot Structures as relevant to downlink MIMO". Taeyoung Kim, Jeongho Park, Junsung Lim, Jaeweon Cho, David Mazzarese (Year: 2008).*

(Continued)

*Primary Examiner* — Ayaz R Sheikh
*Assistant Examiner* — Louis Samara
(74) *Attorney, Agent, or Firm* — Arun Swain

(57) ABSTRACT

This disclosure provides methods, devices and systems for increasing the transmit power of wireless communication devices operating on power spectral density (PSD)-limited wireless channels. Some implementations more specifically relate to pilot tone designs that support distributed transmission. A transmitting device may modulate a physical layer convergence protocol (PLCP) protocol data unit (PPDU) on a number (M) of tones representing a logical RU associated with the legacy tone plan and may further map the M tones to M noncontiguous subcarrier indices associated with a wireless channel. The transmitting device may transmit the PPDU, over the wireless channel, with a number (N) of pilot tones each having a respective location relative to the M tones as mapped to the M noncontiguous subcarrier indices. In some implementations, the relative locations of the N pilot tones may be different than relative locations of a number (K) of pilot tones associated with the logical RU.

24 Claims, 25 Drawing Sheets

(58) Field of Classification Search
CPC ..... H04L 5/0046; H04L 5/0007; H04L 27/26; H04W 72/0446; H04W 84/12
See application file for complete search history.

(56) References Cited

U.S. PATENT DOCUMENTS

| | | | | |
|---|---|---|---|---|
| 2020/0178290 | A1* | 6/2020 | Lee | H04W 72/20 |
| 2021/0014018 | A1* | 1/2021 | Noh | H04L 5/0042 |
| 2021/0273757 | A1* | 9/2021 | Shellhammer | H04W 72/0446 |
| 2021/0392661 | A1* | 12/2021 | Cao | H04L 5/0048 |
| 2022/0022179 | A1* | 1/2022 | Fouad | H04W 4/40 |
| 2022/0140988 | A1* | 5/2022 | Hu | H04L 5/0046 370/329 |
| 2022/0263624 | A1* | 8/2022 | Hu | H04L 5/0007 |
| 2022/0279562 | A1* | 9/2022 | Park | H04W 84/12 |
| 2022/0369315 | A1 | 11/2022 | Yang et al. | |
| 2022/0416988 | A1* | 12/2022 | Cao | H04L 5/0094 |

FOREIGN PATENT DOCUMENTS

| | | |
|---|---|---|
| EP | 2458764 A1 | 5/2012 |
| EP | 4047856 A1 | 8/2022 |
| WO | WO-2018082445 A1 * | 5/2018 |
| WO | WO-2020033422 A1 * | 2/2020 |
| WO | WO-2020068252 A1 * | 4/2020 |
| WO | WO-2021092132 A1 | 5/2021 |
| WO | WO-2021207459 A1 * | 10/2021 |

OTHER PUBLICATIONS

International Search Report and Written Opinion—PCT/US2022/036264—ISA/EPO—dated Oct. 20, 2022.

* cited by examiner

PILOT TONES IN DISTRIBUTED RESOURCE UNIT (DRU) TRANSMISSION

TECHNICAL FIELD

This disclosure relates generally to wireless communication, and more specifically to pilot tone transmissions in distributed resource units (dRUs).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some instances, APs and STAs may be subject to power spectral density (PSD) limits. For example, some APs and STAs that operate in the 6 gigahertz (GHz) frequency band may be required to conform to a low power indoor (LPI) power class, which limits the transmit power of APs and STAs (in the 6 GHz band) to 5 decibel-milliwatts per megahertz (dBm/MHz) and −1 dBm/MHz, respectively. In other words, transmit power in the 6 GHz band is PSD-limited on a per-MHz basis. Such PSD limits can undesirably reduce the range of wireless communications and may reduce packet detection and channel estimation capabilities of APs and STAs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include modulating a physical layer convergence protocol (PLCP) protocol data unit (PPDU) on a number (M) of tones representing a logical resource unit (RU) that is associated with a number (K) of pilot tones each having a respective location relative to the M tones; mapping the M tones to M noncontiguous subcarrier indices of a plurality of subcarrier indices spanning a wireless channel, where the M tones mapped to the M noncontiguous subcarrier indices represent a distributed resource unit (dRU); and transmitting, over the wireless channel, the PPDU including a number (N) of pilot tones each having a respective location relative to the M tones as mapped to the M noncontiguous subcarrier indices, where the relative locations of the N pilot tones are different than the relative locations of the K pilot tones.

In some aspects, N may be different than K. In some other aspects, N may be equal to K. In some implementations, the N pilot tones may carry the same values as the K pilot tones. In some implementations, M=26 and the mapping of the M tones to the M noncontiguous subcarrier indices may change the relative locations of the K pilot tones, where the N pilot tones represent the K pilot tones as a result of the mapping. In some implementations, the mapping of the M tones to the M noncontiguous subcarrier indices may shift the relative locations of the K pilot tones by −3 or +3.

In some aspects, the relative locations of the N pilot tones may be associated with N subcarrier indices of the plurality of subcarrier indices. In some implementations, the N subcarrier indices may be located symmetrically around a center frequency associated with the wireless channel. In some other implementations, the N subcarrier indices may be located asymmetrically around a center frequency associated with the wireless channel. In some implementations, the N subcarrier indices may include N/2 equidistant subcarrier indices located above a carrier frequency associated with the wireless channel and may include N/2 equidistant subcarrier indices located below the carrier frequency.

In some implementations, each of the N subcarrier indices may represent a respective pilot tone location associated with a 26-tone dRU. In some other implementations, at least one of the N subcarrier indices may represent a pilot tone location that is unique to M-tone dRUs. In some implementations, each of the N subcarrier indices may be located a respective distance from a starting subcarrier index of the M noncontiguous subcarrier indices based on a location of a starting subcarrier index relative to the wireless channel and a dRU index associated with the dRU.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including modulating a PPDU on a number (M) of tones representing a logical RU that is associated with a number (K) of pilot tones each having a respective location relative to the M tones; mapping the M tones to M noncontiguous subcarrier indices of a plurality of subcarrier indices spanning a wireless channel, where the M tones mapped to the M noncontiguous subcarrier indices represent a dRU; and transmitting, over the wireless channel, the PPDU including a number (N) of pilot tones each having a respective location relative to the M tones as mapped to the M noncontiguous subcarrier indices, where the relative locations of the N pilot tones are different than the relative locations of the K pilot tones.

Another innovative aspect of the subject matter described in this disclosure can be implemented as a method of wireless communication. The method may be performed by a wireless communication device, and may include receiving a PPDU over a wireless channel, where the PPDU is carried on a number (M) of tones mapped to M noncontiguous subcarrier indices of a plurality of subcarrier indices spanning the wireless channel, and where the M tones mapped to the M noncontiguous subcarrier indices represent a dRU; recovering, from the received PPDU, a number (N) of pilot tones each having a respective location relative to the M tones as mapped to the M noncontiguous subcarrier indices; and demapping the M tones from the M noncontiguous subcarrier indices, where the demapped M tones represent a logical RU that is associated with a number (K) of pilot tones each having a respective location relative to the demapped M tones, where the relative locations of the K pilot tones are different than the relative locations of the N pilot tones.

In some aspects, N may be different than K. In some other aspects, N may be equal to K. In some implementations, the N pilot tones may carry the same values as the K pilot tones. In some implementations, M=26 and the demapping of the M tones to the M noncontiguous subcarrier indices may change the relative locations of the N pilot tones, where the K pilot tones represent the N pilot tones as a result of the mapping. In some implementations, the demapping of the M tones to the M noncontiguous subcarrier indices may shift the relative locations of the N pilot tones by −3 or +3.

In some aspects, the relative locations of the N pilot tones may be associated with N subcarrier indices of the plurality of subcarrier indices. In some implementations, the N subcarrier indices may be located symmetrically around a center frequency associated with the wireless channel. In some other implementations, the N subcarrier indices may be located asymmetrically around a center frequency associated with the wireless channel. In some implementations, the N subcarrier indices may include N/2 equidistant subcarrier indices located above a carrier frequency associated with the wireless channel and may include N/2 equidistant subcarrier indices located below the carrier frequency.

In some implementations, each of the N subcarrier indices may represent a respective pilot tone location associated with a 26-tone dRU. In some other implementations, at least one of the N subcarrier indices may represent a pilot tone location that is unique to M-tone dRUs. In some implementations, each of the N subcarrier indices may be located a respective distance from a starting subcarrier index of the M noncontiguous subcarrier indices based on a location of a starting subcarrier index relative to the wireless channel and a dRU index associated with the dRU.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving a PPDU over a wireless channel, where the PPDU is carried on a number (M) of tones mapped to M noncontiguous subcarrier indices of a plurality of subcarrier indices spanning the wireless channel, and where the M tones mapped to the M noncontiguous subcarrier indices represent a dRU; recovering, from the received PPDU, a number (N) of pilot tones each having a respective location relative to the M tones as mapped to the M noncontiguous subcarrier indices; and demapping the M tones from the M noncontiguous subcarrier indices, where the demapped M tones represent a logical RU that is associated with a number (K) of pilot tones each having a respective location relative to the demapped M tones, where the relative locations of the K pilot tones are different than the relative locations of the N pilot tones.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
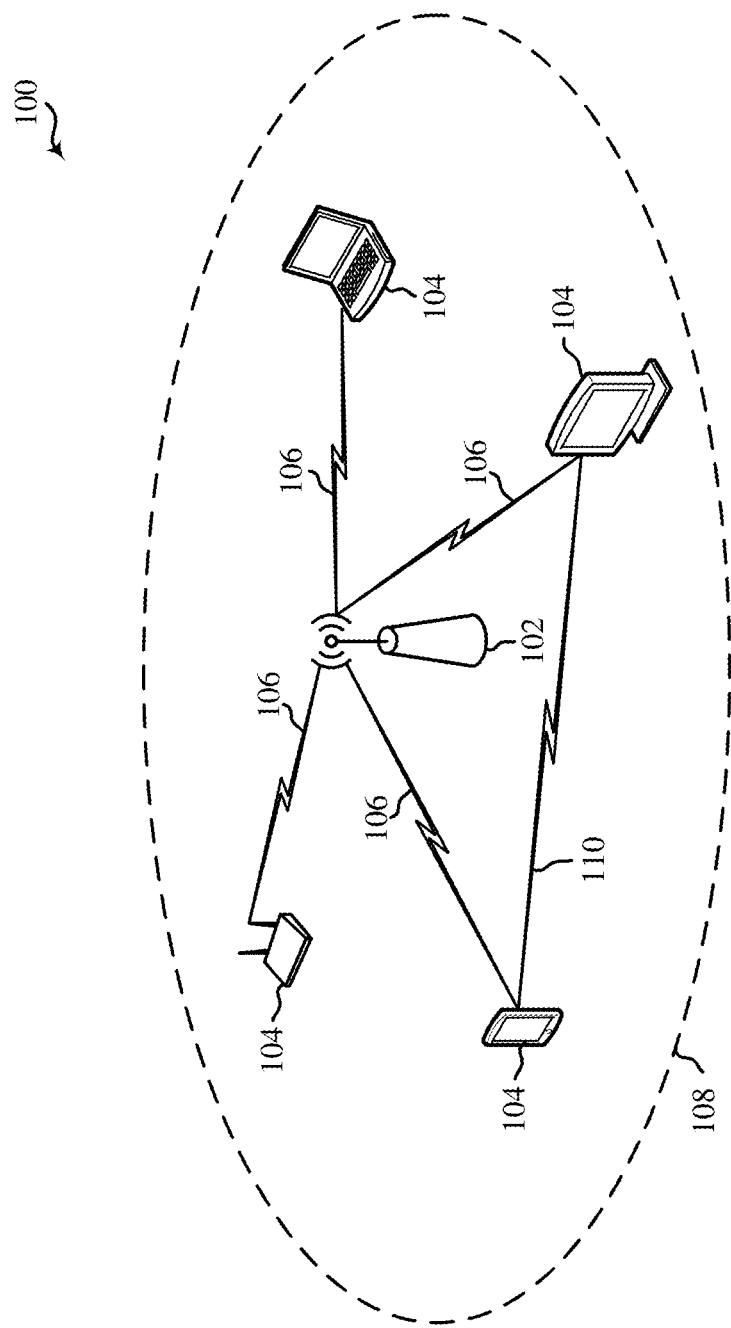
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to distributed transmissions, and more particularly, to pilot tone designs that support distributed transmissions in power spectral density (PSD)-limited wireless channels. As used herein, the term "distributed transmission" refers to physical layer convergence protocol (PLCP) protocol data unit (PPDU) transmissions on noncontiguous tones (or subcarriers) of a wireless channel (such as in accordance with a "distributed tone plan"). In contrast, the term "contiguous transmission" refers to PPDU transmissions on one or more sets of contiguous tones that represent one or more resource units (RUs), respectively, as defined by existing versions of the IEEE 802.11 standard (also referred to as a "legacy tone plan"). For example, for a distributed transmission, a transmitting device may modulate a PPDU on a number (M) of tones representing a logical RU associated with the legacy tone plan and may further map the M tones to M noncontiguous subcarrier indices associated with a wireless channel. In some aspects, the transmitting device may transmit the PPDU, over the wireless channel, with a number (N) of pilot tones each having a respective location relative to the M tones as mapped to the M noncontiguous subcarrier indices. In some implementations, the relative locations of the N pilot tones may be different than relative locations of a number (K) of pilot tones associated with the logical RU (as specified by the legacy tone plan). For example, K=2 pilot tones may be assigned to the $6^{th}$ and $20^{th}$ tones among the M tones representing the logical RU (as specified by the legacy tone plan) while N=2 pilot tones may be assigned to the $2^{nd}$ and $15^{th}$ tones among the M tones mapped to the M noncontiguous subcarrier indices.

Particular implementations of the subject matter described in this disclosure can be implemented to realize one or more of the following potential advantages. Distributed transmission provides greater flexibility in medium utilization for PSD-limited wireless channels. In some implementations, a distributed tone plan may map the pilot tone locations associated with the logical RU to localized regions of the wireless channel. Pilot tones are used for phase alignment and parameter tracking. However, when pilot tones are squeezed into localized regions of the wireless channel, interference in such localized regions can effectively eliminate the pilot tones in the dRU. For example, a receiving device may fail to receive any pilot tones if it experiences a deep fade in any of these localized regions. However, by changing the relative locations of pilot tones between the logical RU (as specified by the legacy tone plan) and the dRU, aspects of the present disclosure may ensure that the pilot tones associated with the dRU are evenly distributed across the wireless channel or otherwise distributed in a manner that is more robust against interference on the wireless channel. For example, evenly distributing the pilot tones over the wireless channel increases the likelihood that a receiving device will receive at least some of the pilot tones even if it experiences a deep fade in one or more localized regions of the wireless channel.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
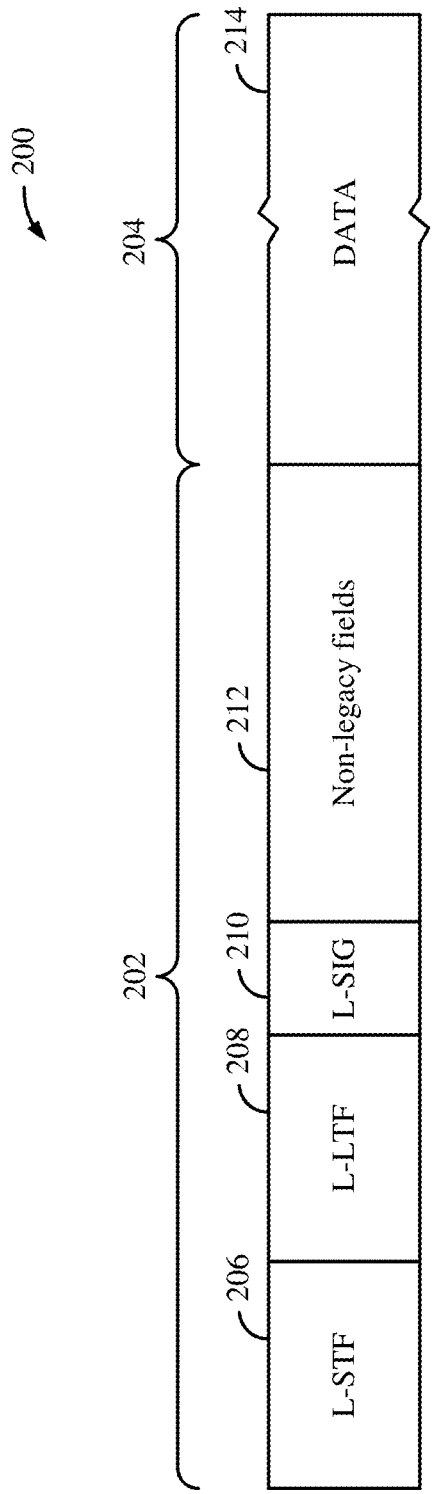
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
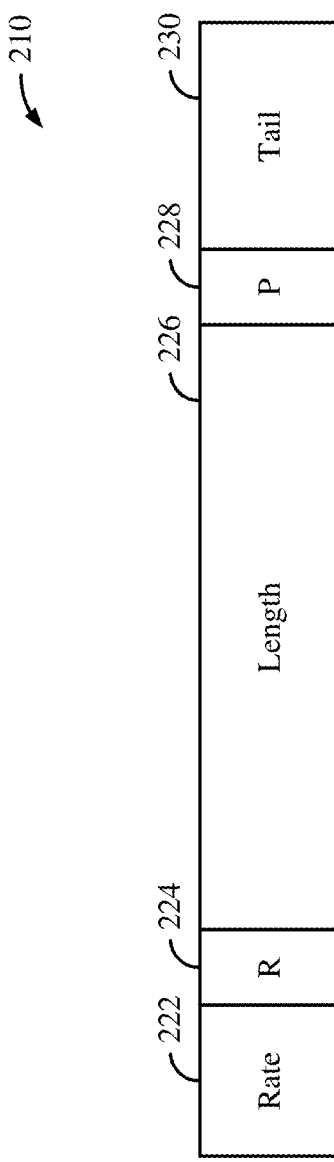
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
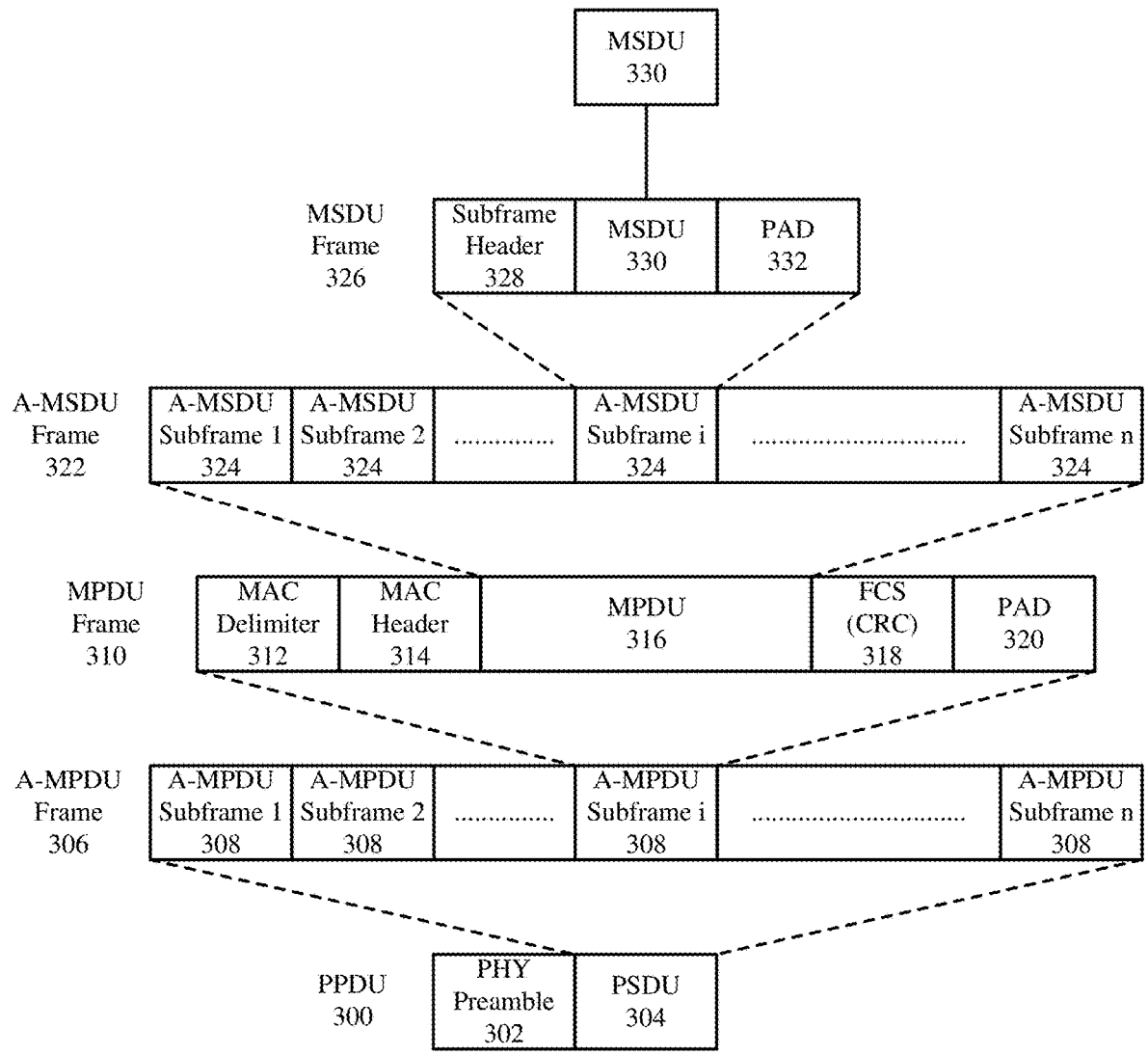
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
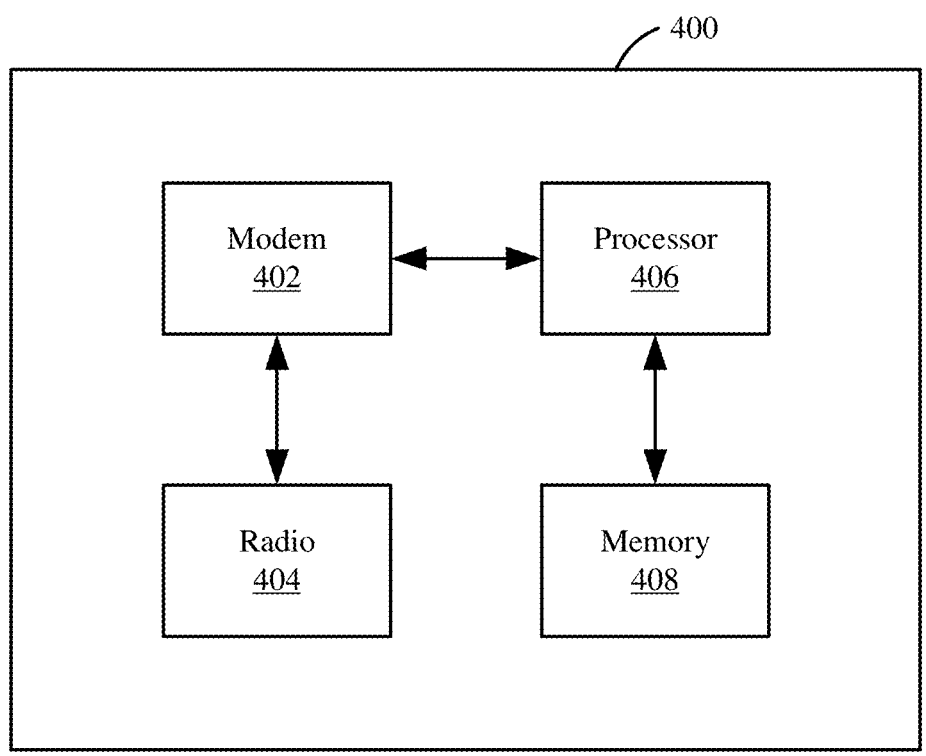
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
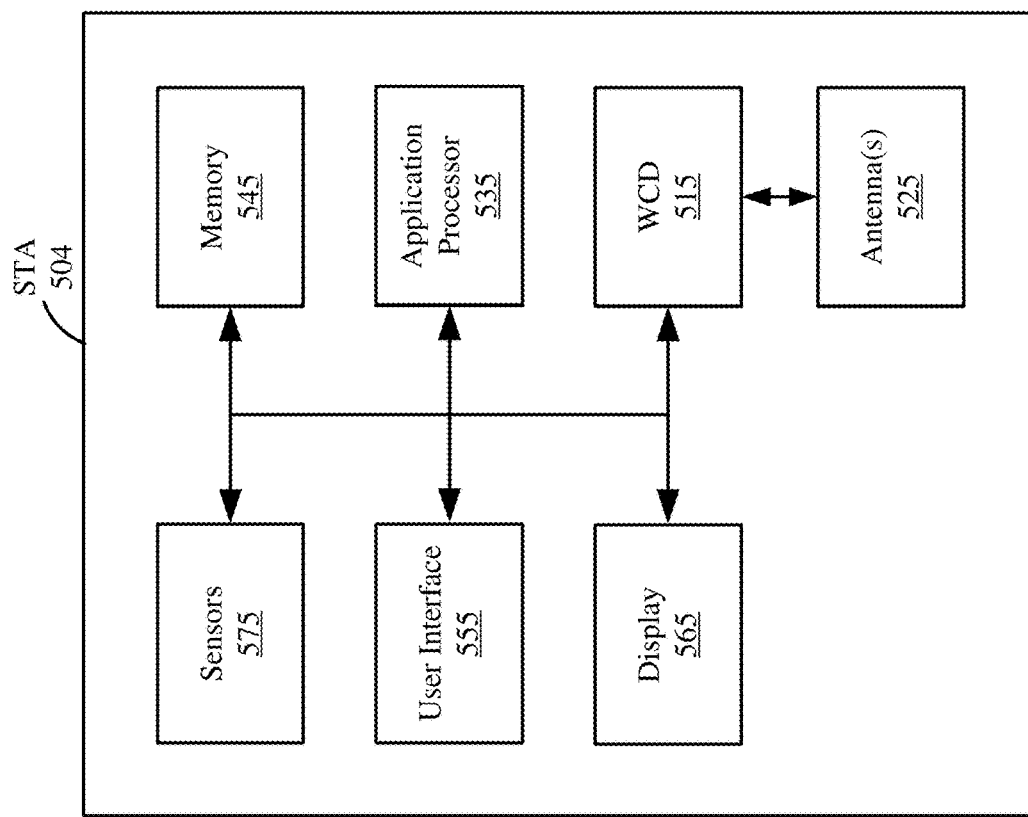
FIG. 5B shows a block diagram of an example STA.
Figure 5A:
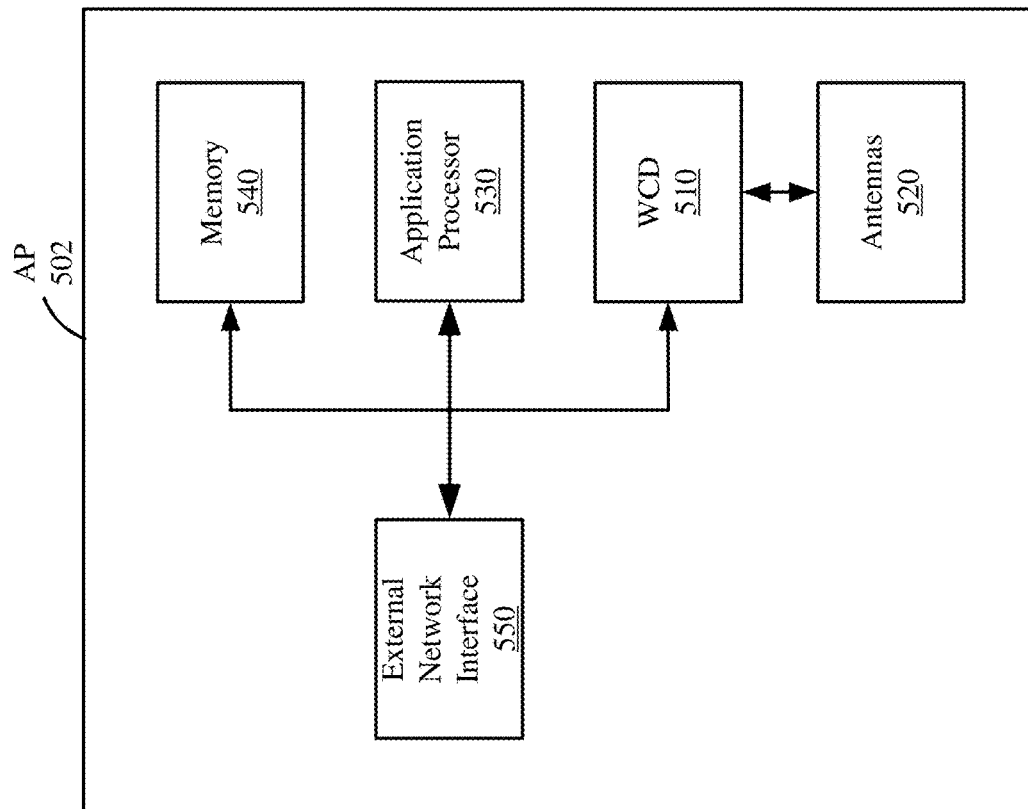
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, some APs and STAs may be subject to power spectral density (PSD) limits. For example, some APs and STAs that operate in the 6 GHz frequency band may be required to conform to a low power indoor (LPI) power class, which limits the transmit power of APs and STAs (in the 6 GHz band) to 5 dBm/MHz and −1 dBm/MHz, respectively. In other words, transmit power in the 6 GHz band is PSD-limited on a per-MHz basis. Such PSD limits can undesirably reduce the range of wireless communications and may reduce packet detection and channel estimation capabilities of APs and STAs.

Various aspects relate generally to distributed transmissions, and more particularly, to pilot tone designs that support distributed transmissions in PSD-limited wireless channels. As used herein, the term "distributed transmission" refers to PPDU transmissions on noncontiguous tones (or subcarriers) of a wireless channel (such as in accordance with a "distributed tone plan"). In contrast, the term "contiguous transmission" refers to PPDU transmissions on one or more sets of contiguous tones that represent one or more RUs, respectively, as defined by existing versions of the IEEE 802.11 standard (also referred to as a "legacy tone plan"). For example, for a distributed transmission, a transmitting device may modulate a PPDU on a number (M) of tones representing a logical RU associated with the legacy tone plan and may further map the M tones to M noncontiguous subcarrier indices associated with a wireless channel, where the M tones mapped to the M noncontiguous subcarrier indices represent a dRU associated with the distributed tone plan. In some aspects, the transmitting device may transmit the PPDU, over the wireless channel, with a number (N) of pilot tones each having a respective location relative to the M tones as mapped to the M noncontiguous subcarrier indices. In some implementations, the relative locations of the N pilot tones may be different than relative locations of a number (K) of pilot tones associated with the logical RU (as specified by the legacy tone plan). For example, K=2 pilot tones may be assigned to the $6^{th}$ and $20^{th}$ tones among the M tones representing the logical RU (as specified by the legacy tone plan) while N=2 pilot tones may be assigned to the $2^{nd}$ and $15^{th}$ tones among the M tones mapped to the M noncontiguous subcarrier indices.

Figure 6:
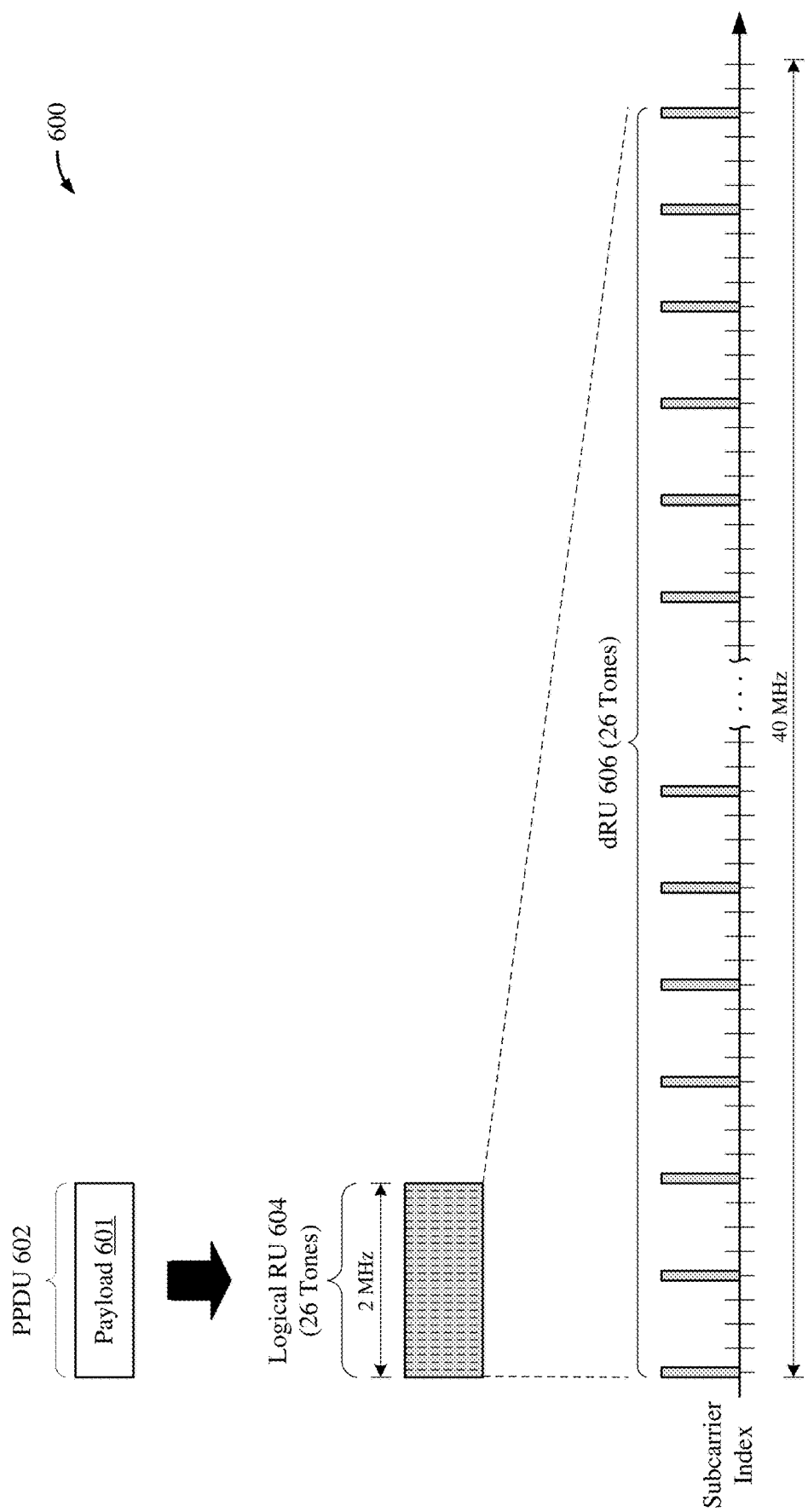
FIG. 6 shows a frequency diagram depicting an example distributed tone mapping according to some implementations.

Particular implementations of the subject matter described in this disclosure can be implemented to realize one or more of the following potential advantages. Distributed transmission provides greater flexibility in medium utilization for PSD-limited wireless channels. In some implementations, a distributed tone plan may map the pilot tone locations associated with the logical RU to localized regions of the wireless channel. Pilot tones are used for phase alignment and parameter tracking. However, when pilot tones are squeezed into localized regions of the wireless channel, interference in such localized regions can effectively eliminate the pilot tones in the dRU. For example, a receiving device may fail to receive any pilot tones if it experiences a deep fade in any of these localized regions. However, by changing the relative locations of pilot tones between the logical RU (as specified by the legacy tone plan) and the dRU, aspects of the present disclosure may ensure that the pilot tones associated with the dRU are evenly distributed across the wireless channel or otherwise distributed in a manner that is more robust against interference on the wireless channel. For example, evenly distributing the pilot tones over the wireless channel increases the likelihood that a receiving device will receive at least some of the pilot tones even if it experiences a deep fade in one or more localized regions of the wireless channel FIG. 6 shows a frequency diagram 600 depicting an example distributed tone mapping according to some implementations. More specifically, FIG. 6 shows an example mapping of a payload 601 of a PPDU 602 to a set of tones or subcarriers for transmission over a wireless channel. In some implementations, the payload 601 may be modulated on a regular RU (rRU) corresponding to a logical RU 604 associated with a legacy tone plan and further mapped to a distributed RU (dRU) 606 in accordance with a distributed tone plan. The logical RU 604 represents a number of tones or subcarriers that are allocated for the transmission of the PPDU 602. In contrast, the dRU 606 represents the physical resources (identified by subcarrier indices) that are modulated to transmit the PPDU 602. As used herein, the term "distributed RU" (or dRU) refers to any logical RU that is distributed across a set of noncontiguous subcarrier indices, and the term "distributed tone plan" refers to the set of noncontiguous subcarrier indices associated with a dRU.

Existing versions of the IEEE 802.11 standard define a number of RUs and multiple RUs (MRUs) of various sizes that map to contiguous tones or subcarriers spanning a frequency bandwidth (or wireless channel). For example, a 242-tone RU maps to 242 contiguous subcarrier indices spanning a 20 MHz bandwidth. Similarly, a 484+242-tone MRU maps to 484 contiguous subcarrier indices spanning a 40 MHz bandwidth and to 242 contiguous subcarrier indices spanning a 20 MHz bandwidth. As used herein, the term "regular RU" (or rRU) refers to any RU or MRU configuration that is supported by existing versions of the IEEE 802.11 standard (including the IEEE 802.11be amendment of the IEEE 802.11 standard), and the term "legacy tone plan" refers to any tone plan defined by existing versions of the IEEE 802.11 standard.

In some implementations, the logical RU 604 may represent an rRU as defined by existing versions of the IEEE 802.11 standard. In other words, the logical RU 604 maps directly to a respective rRU according to a legacy tone plan. In the example of FIG. 6, the logical RU 604 includes 26 tones. Thus, under the legacy tone plan, the logical RU 604 would map directly to 26 contiguous or consecutive subcarrier indices spanning a 2 MHz subchannel. However, when mapped to an rRU, the transmit power of the logical RU 604 may be severely limited based on the PSD of the wireless channel. For example, the LPI power class limits the transmit power of APs and STAs to 5 dBm/MHz and −1 dBm/MHz, respectively, in the 6 GHz band. As such, the per-tone transmit power of the logical RU 604 is limited by the number of tones mapped to each 1 MHz subchannel of the wireless channel. Accordingly, each 1 MHz subchannel of a PSD-limited channel may be referred to herein as a "PSD-limited subchannel."

Aspects of the present disclosure recognize that the per-tone transmit power of the logical RU 604 can be increased by distributing the tones across a wider bandwidth. Increasing the per-tone transmit power can also increase the overall transmit power of the logical RU 604. Thus, in some implementations, the logical RU 604 may be mapped to a set of noncontiguous subcarrier indices spanning a wider-bandwidth channel. With reference for example to FIG. 6, the logical RU 604 is mapped to the dRU 606 according to a distributed tone plan. More specifically, the logical RU 604 is mapped to 26 noncontiguous subcarrier indices spread across a 40 MHz wireless channel (also referred to herein as a "dRU spreading bandwidth"). Compared to the tone mapping described above with respect to the legacy tone plan, the distributed tone mapping depicted in FIG. 6 effectively reduces the number of tones (of the logical RU 604) in each 1 MHz subchannel. For example, each of the 26 tones can be mapped to a different 1 MHz subchannel of the 40 MHz channel. As a result, each AP or STA implementing the distributed tone mapping of FIG. 6 can maximize its per-tone transmit power (which may maximize the overall transmit power of the logical RU 604).

In some implementations, a transmitting device (such as a STA or an AP) may include a distributed tone mapper that maps the logical RU 604 to the dRU 606 in the frequency domain (such as described with reference to FIG. 6). The dRU 606 is then converted to a time-domain signal (such as by an inverse fast Fourier transform (IFFT)) for transmission over a wireless channel. A receiving device (such as an AP or a STA) receives the time-domain signal over the wireless channel and converts the time-domain signal back to the dRU 606 (such as by a fast Fourier transform (FFT)). In some implementations, the receiving device may include a distributed tone demapper that demaps the dRU 606 to the logical RU 604. In other words, the distributed tone demapper reverses the mapping performed by the distributed tone mapper at the transmitting device. The receiving device can then recover the information carried (or modulated) on the logical RU 604 as a result of the demapping.

In the example of FIG. 6, the logical RU 604 is distributed evenly across a 40 MHz wireless channel. However, in actual implementations, the logical RU 604 can be mapped to any suitable pattern of noncontiguous subcarrier indices. For example, in some aspects, the distance between any pair of modulated tones may be less than or greater than the distances depicted in FIG. 6. Still further, in some aspects, multiple logical RUs may be mapped to interleaved subcarrier indices of a shared wireless channel.

Figure 7:
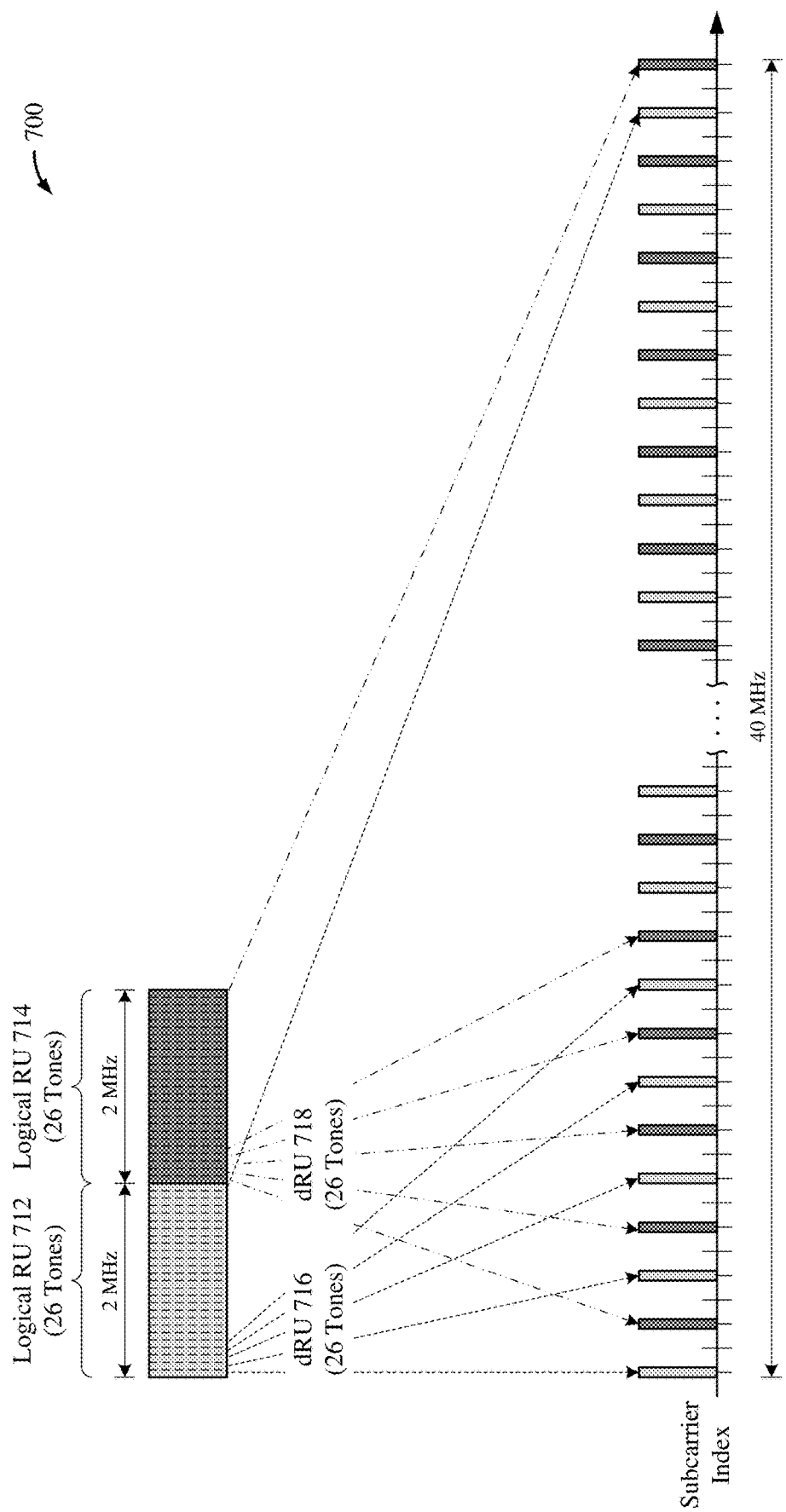
FIG. 7 shows a frequency diagram depicting an example mapping of logical resource unit (RUs) to distributed RU (dRUs), on a shared wireless channel, according to some implementations.

FIG. 7 shows a frequency diagram depicting an example mapping of logical RUs to dRUs, on a shared wireless channel, according to some implementations. More specifically, FIG. 7 shows an example mapping of logical RUs 712 and 714 to dRUs 716 and 718, respectively. In some implementations, each of the logical RUs 712 and 714 may carry user data for a respective STA (not shown for simplicity).

In the example of FIG. 7, each of the logical RUs 712 and 714 includes 26 tones. In some implementations, the logical RUs 712 and 714 are mapped to the dRUs 716 and 718, respectively, according to a distributed tone plan. More specifically, each of the logical RUs 712 and 714 is mapped to a respective set of 26 noncontiguous subcarrier indices spread across a 40 MHz wireless channel. Thus, as shown in FIG. 7, the dRU 716 is interleaved with the dRU 718 across a shared 40 MHz wireless channel. Aspects of the present disclosure recognize that, by interleaving the dRUs 716 and 718, the per-tone transmit power of each dRU can be significantly increased without sacrificing spectral efficiency.

To support distributed transmissions, new packet designs and signaling are needed to indicate whether a PPDU is to be transmitted on tones spanning an rRU (according to a legacy tone plan) or a dRU (according to a distributed tone plan). For example, existing versions of the IEEE 802.11 standard define a trigger frame format which can be used to solicit the transmission of a TB PPDU from one or more STAs. The trigger frame allocates resources to the STAs for the transmission of the TB PPDU and indicates how the TB PPDU is to be configured for transmission. For example, the trigger frame may indicate a logical RU (or MRU) that is allocated for transmission in the TB PDDU. In some implementations, the trigger frame may be further configured to carry tone distribution information indicating whether the logical RU (or MRU) maps to an rRU or a dRU.

Figure 8:
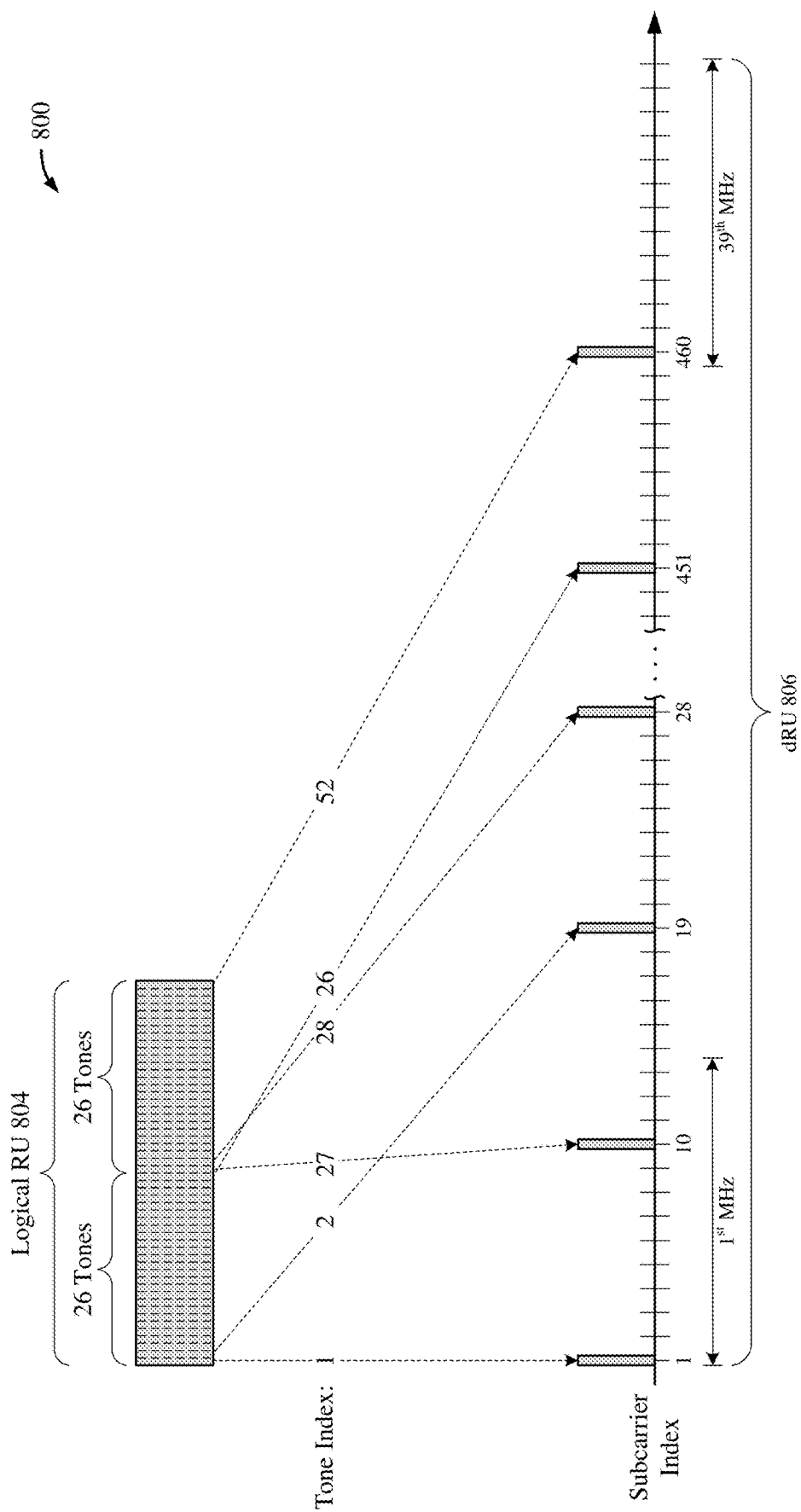
FIG. 8 shows a frequency diagram depicting an example mapping of a logical RU to a dRU according to some implementations.

FIG. 8 shows a frequency diagram depicting an example mapping of a logical RU 804 to a dRU 806 according to some implementations. In the example of FIG. 8, the logical RU 804 includes 52 tones and the dRU spreading bandwidth is equal to 40 MHz. In some implementations, the 52 tones associated with the logical RU 804 may be mapped to 52 noncontiguous subcarrier indices associated with the 40 MHz channel in accordance with a distributed tone plan that maps the first 26 tones of the logical RU 804 to every $18^{th}$ subcarrier index starting at subcarrier index 1 and maps the remaining 26 tones of the logical RU 804 to every $18^{th}$ subcarrier index starting at subcarrier index 10. In other words, the 52-tone logical RU 804 is treated as two 26-tone RUs, that are offset by 9 subcarrier indices, for purposes of the distributed tone mapping.

In the example of FIG. 8, the first tone of the logical RU 804 (tone_idx=1) is mapped to subcarrier index 1 and the second tone of the logical RU 804 (tone_idx=2) is mapped to subcarrier index 19. This process continues until the $26^{th}$ tone of the logical RU 804 (tone_idx=26) is mapped to subcarrier index 451. After the first 26 tones of the logical RU 804 have been mapped to the dRU 806, the process is repeated for the next 26 tones of the logical RU 804 beginning with a subcarrier offset of 9. In other words, the $27^{th}$ tone of the logical RU 804 (tone_idx=27) is mapped to subcarrier index 10 and the $28^{th}$ tone of the logical RU 804 (tone_idx=28) is mapped to subcarrier index 28. This process continues until the $52^{nd}$ tone of the logical RU 804 (tone_idx=52) is mapped to subcarrier index 460. Thus, as shown in FIG. 8, the distributed tone plan effectively interleaves two 26-tone RUs across the dRU spreading bandwidth.

Figure 9A:
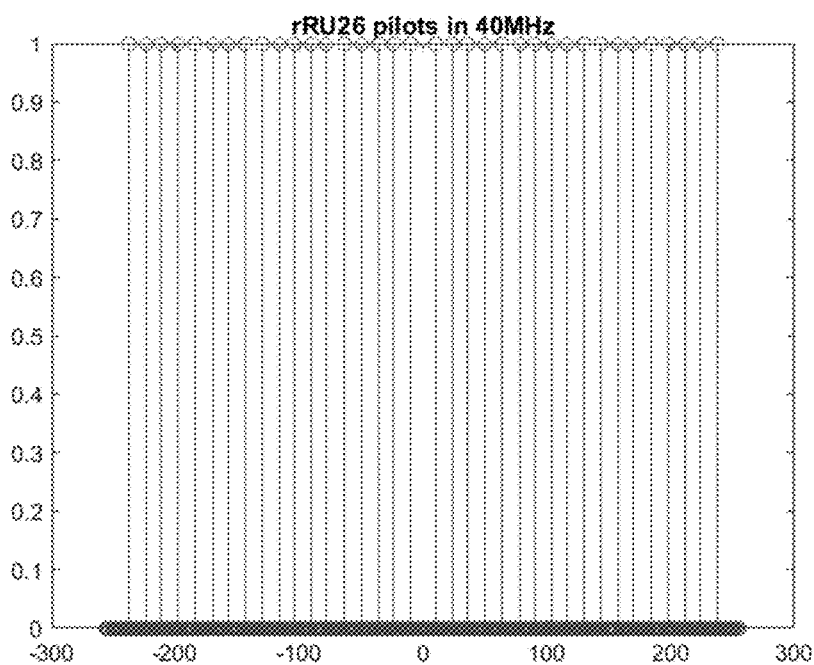
FIG. 9A shows a frequency diagram depicting an example distribution of pilot tones across a wireless channel in accordance with a legacy tone plan.
Figure 9B:
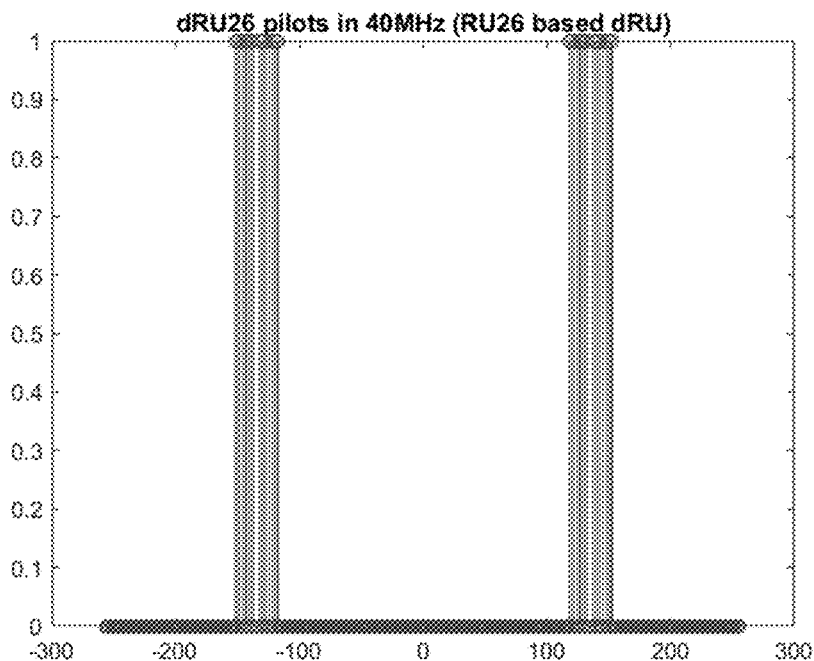
FIG. 9B shows a frequency diagram depicting an example distribution of pilot tones across a wireless channel in accordance with a distributed tone plan.

Aspects of the present disclosure recognize that such interleaving of RUs can change the distribution of pilot tones over the wireless channel. For example, FIG. 9A shows a frequency diagram 900 depicting an example distribution of pilot tones across a wireless channel in accordance with a legacy tone plan. More specifically, FIG. 9A shows the pilot tone locations associated with 26-tone rRUs distributed across a 40 MHz channel. As shown in FIG. 9A, the pilot tones are evenly distributed throughout the 40 MHz channel. In contrast, FIG. 9B shows a frequency diagram 910 depicting an example distribution of pilot tones across a wireless channel in accordance with a distributed tone plan. More specifically, FIG. 9B shows the pilot tone locations when existing 26-tone logical RUs are mapped to a 40 MHz channel in accordance with the distributed tone plan described above with reference to FIG. 8 and the pilot tones are mapped according to their relative locations within the corresponding rRU. As shown in FIG. 9B, the pilot tones are squeezed into two localized regions of the 40 MHz channel.

The pilot tones are used for phase alignment and parameter tracking. Aspects of the present disclosure recognize that, when the pilot tones are squeezed into localized regions of the wireless channel (such as shown in FIG. 9B), interference in such localized regions can effectively eliminate the pilot tones in the dRU. For example, a receiving device may not receive any of the pilot tones if it experiences a deep fade, narrowband interference, or spurs in the localized regions depicted in FIG. 9B. In some aspects, the relative locations of pilot tones associated with a dRU (also referred to as "distributed pilots") may be different than the relative locations of pilot tones associated with the associated rRU (also referred to as "legacy pilots"). For example, the changes in relative pilot tone locations from the rRU to the dRU may ensure a more even or robust distribution of the distributed pilots across the dRU spreading bandwidth.

With reference for example to FIG. 9A, each 26-tone rRU includes a pair of pilot tones (one on either side of the carrier frequency on which the rRU is transmitted). The legacy tone plan defines two sets of relative pilot tone locations that can be assigned to the pilot tone pair of any 26-tone rRU: [6,20] and [7,21]. In other words, pilot tones may be assigned to the $6^{th}$ and $20^{th}$ tone positions of some 26-tone rRUs (rRU26$_i$) and may be assigned to the $7^{th}$ and $21^{st}$ tone positions of some other 26-tone rRUs (rRU26$_j$). Because there is a negligible difference between the relative pilot tone locations in rRU26$_i$ and the relative pilot tone locations in rRU26$_j$, the pilot tone locations are squeezed into the two localized regions shown in FIG. 9B when multiple 26-tone logical RUs are mapped to a dRU spreading bandwidth in an interleaved manner (such as described with reference to FIG. 8). Aspects of the present disclosure recognize that greater diversity between the relative pilot tone locations in rRU26$_i$ and the relative pilot tone locations in rRU26$_j$ may help improve the distribution of pilot tones over the dRU spreading bandwidth.

Figure 10:
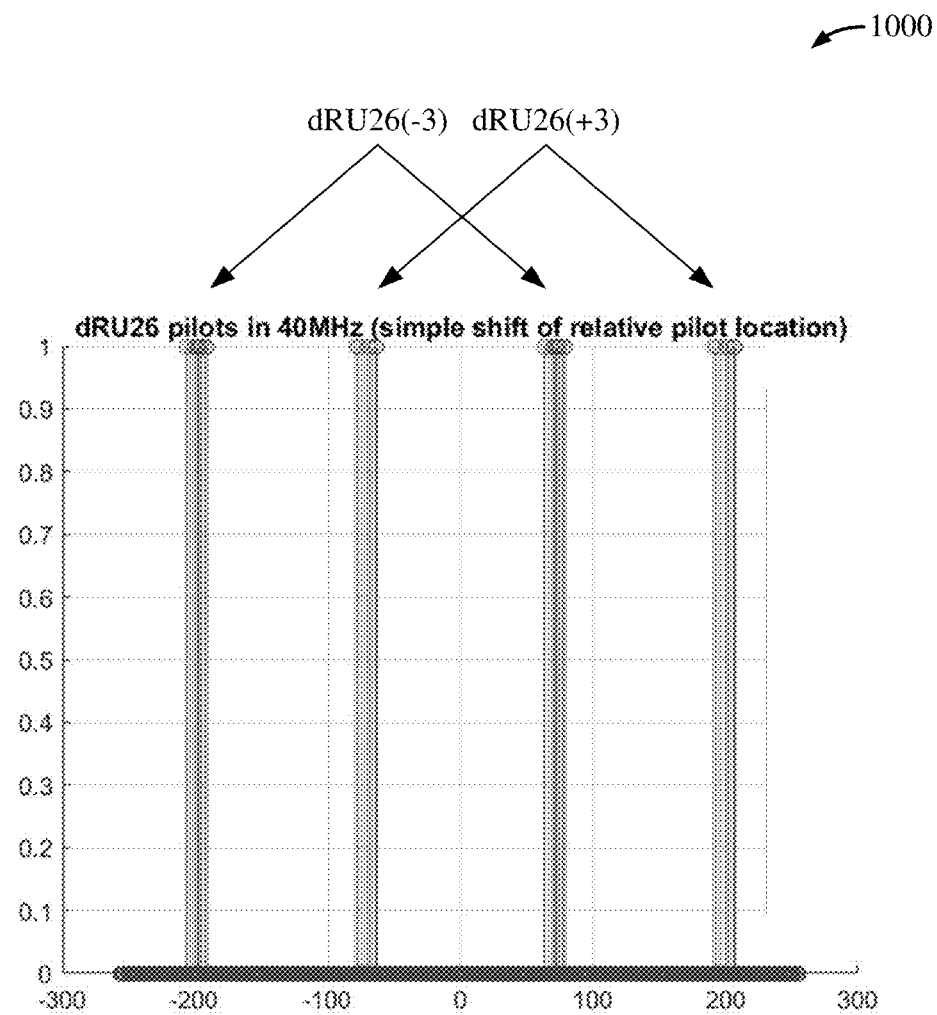
FIG. 10 shows a frequency diagram depicting an example distribution of pilot tones across a wireless channel according to some implementations.

In some implementations, the distributed tone plan may change the pilot tone locations associated with a logical RU so that the pilot tone locations are spread over a greater portion of a wireless channel when mapped to a dRU. For example, the relative pilot tone locations associated with rRU26$_i$ may be shifted 3 tones to the left (resulting in new relative pilot tone locations [3,17]) and the relative pilot tone locations associated with rRU26$_j$ may be shifted 3 tones to the right (resulting in new relative pilot tone locations [10,24]) prior to mapping the 26 tones of each logical RU to a dRU spreading bandwidth. As a result, when multiple 26-tone logical RUs are mapped to a dRU spreading bandwidth in an interleaved manner, the pilot tones will be distributed across a larger range of subcarrier indices in the resulting dRU. For example, FIG. 10 shows a frequency diagram 1000 depicting an example distribution of pilot tones as a result of changing the relative pilot tone locations associated with 26-tone logical RUs. Compared to the pilot tone distribution depicted in FIG. 9B, the new relative pilot tone locations associated with FIG. 10 significantly improves the spread of the pilot tones mapped to each dRU.

Aspects of the present disclosure recognize that larger RU sizes are associated with greater numbers of pilot tones and are thus naturally more robust against narrowband interference. Thus, in some implementations, the relative pilot tone locations associated with RU sizes greater than 26 may remain unchanged. Tables 1-3 provide a summary of how the new relative pilot tone locations affect the mapping of pilot tones to various dRUs that are distributed over 20 MHz, 40 MHz, and 80 MHz dRU spreading bandwidths, respectively. In Tables 1-3, a −3 tone shift is applied to the relative pilot tone locations [6,20] and a +3 tone shift is applied to the relative pilot tone locations [7,21]. However, various other tone shifts may be applied to any of the 26-tone RUs. For example, in some implementations, +3 tone shift may be applied to the relative pilot tone locations [6,20] and a −3 tone shift may be applied to the relative pilot tone locations [7,21]. In some other implementations, a −3 tone shift may be applied to the relative pilot tone locations associated with RU26-1-RU26-9 (including [6,20] and [7,21]) and a +3 tone shift may be applied to the relative pilot tone locations associated with RU26-10-RU26-18 (including [6,20] and [7,21]).

TABLE 1

| RU Size and Index | Relative Pilot Location (Starting Tone Index = 1) | dRU Pilot Tone Indices (20 MHz Spreading BW) |
|---|---|---|
| RU26-1 | [6, 20] − 3 | [−102 33] |
| RU26-2 | [6, 20] − 3 | [−98 37] |
| RU26-3 | [7, 21] + 3 | [−37 98] |
| RU26-4 | [7, 21] + 3 | [−33 102] |
| RU26-5 | [7, 21] + 3 | [−31 95] |
| RU26-6 | [6, 20] − 3 | [−101 34] |
| RU26-7 | [6, 20] − 3 | [−97 38] |
| RU26-8 | [7, 21] + 3 | [−36 99] |
| RU26-9 | [7, 21] + 3 | [−32 94] |
| RU52-1 | [6, 20, 32, 46] | [−98 −35 28 91] |
| RU52-2 | [7, 21, 33, 47] | [−91 −28 35 98] |
| RU52-3 | [6, 20, 32, 46] | [−97 −34 29 92] |
| RU52-4 | [7, 21, 33, 47] | [−90 −27 31 94] |
| RU106-1 | [7, 33, 75, 101] | [−107 −48 51 109] |
| RU106-2 | [6, 32, 74, 100] | [−108 −50 47 106] |

TABLE 2

| RU Size and Index | Relative Pilot Location (Starting Tone Index = 1) | dRU Pilot Tone Indices (40 MHz Spreading BW) |
|---|---|---|
| RU26-1 | [6, 20] − 3 | [−206 64] |
| RU26-2 | [6, 20] − 3 | [−197 73] |
| RU26-3 | [6, 20] − 3 | [−202 68] |
| RU26-4 | [6, 20] − 3 | [−193 77] |
| RU26-5 | [7, 21] + 3 | [−63 207] |
| RU26-6 | [6, 20] − 3 | [−204 66] |
| RU26-7 | [6, 20] − 3 | [−195 75] |
| RU26-8 | [6, 20] − 3 | [−200 70] |
| RU26-9 | [6, 20] − 3 | [−191 79] |
| RU26-10 | [7, 21] + 3 | [−79 191] |
| RU26-11 | [7, 21] + 3 | [−70 200] |
| RU26-12 | [7, 21] + 3 | [−75 195] |
| RU26-13 | [7, 21] + 3 | [−66 204] |
| RU26-14 | [6, 20] − 3 | [−198 72] |
| RU26-15 | [7, 21] + 3 | [−77 193] |
| RU26-16 | [7, 21] + 3 | [−68 202] |
| RU26-17 | [7, 21] + 3 | [−73 197] |
| RU26-18 | [7, 21] + 3 | [−64 206] |
| RU52-1 | [6, 20, 32, 46] | [−197 −71 55 181] |
| RU52-2 | [6, 20, 32, 46] | [−193 −67 59 185] |
| RU52-3 | [6, 20, 32, 46] | [−195 −69 57 183] |
| RU52-4 | [6, 20, 32, 46] | [−191 −65 61 187] |
| RU52-5 | [7, 21, 33, 47] | [−187 −61 65 191] |
| RU52-6 | [7, 21, 33, 47] | [−183 −57 69 195] |
| RU52-7 | [7, 21, 33, 47] | [−185 −59 67 193] |

TABLE 2-continued

| RU Size and Index | Relative Pilot Location (Starting Tone Index = 1) | dRU Pilot Tone Indices (40 MHz Spreading BW) |
|---|---|---|
| RU52-8 | [7, 21, 33, 47] | [−181 −55 71 197] |
| RU106-1 | [6, 32, 74, 100] | [−220 −103 95 212] |
| RU106-2 | [6, 32, 74, 100] | [−218 −101 97 214] |
| RU106-3 | [7, 33, 75, 101] | [−214 −97 101 218] |
| RU106-4 | [7, 33, 75, 101] | [−212 −95 103 220] |
| RU242-1 | [7, 33, 75, 101, 141, 167, 209, 235] | [−231 −179 −96 −44 41 93 176 228] |
| RU242-2 | [8, 34, 76, 102, 142, 168, 210, 236] | [−230 −178 −93 −41 44 96 180 233] |

TABLE 3

| RU Size and Index | Relative Pilot Location (Starting Tone Index = 1) | dRU Pilot Tone Indices (80 MHz Spreading BW) |
|---|---|---|
| RU52-1 | [6, 20, 32, 46] | [−395 −143 105 357] |
| RU52-2 | [6, 20, 32, 46] | [−387 −135 113 365] |
| RU52-3 | [6, 20, 32, 46] | [−391 −139 109 361] |
| RU52-4 | [6, 20, 32, 46] | [−383 −131 117 369] |
| RU52-5 | [7, 21, 33, 47] | [−369 −117 131 383] |
| RU52-6 | [7, 21, 33, 47] | [−361 −109 139 391] |
| RU52-7 | [7, 21, 33, 47] | [−373 −121 127 379] |
| RU52-8 | [7, 21, 33, 47] | [−365 −113 135 387] |
| RU52-9 | [6, 20, 32, 46] | [−394 −142 106 358] |
| RU52-10 | [6, 20, 32, 46] | [−386 −134 114 366] |
| RU52-11 | [6, 20, 32, 46] | [−390 −138 110 362] |
| RU52-12 | [6, 20, 32, 46] | [−382 −130 118 370] |
| RU52-13 | [7, 21, 33, 47] | [−368 −116 132 384] |
| RU52-14 | [7, 21, 33, 47] | [−360 −108 140 392] |
| RU52-15 | [7, 21, 33, 47] | [−372 −120 128 380] |
| RU52-16 | [7, 21, 33, 47] | [−364 −112 136 388] |
| RU106-1 | [6, 32, 74, 100] | [−447 −215 197 429] |
| RU106-2 | [6, 32, 74, 100] | [−443 −211 201 433] |
| RU106-3 | [7, 33, 75, 101] | [−433 −201 211 443] |
| RU106-4 | [7, 33, 75, 101] | [−437 −205 207 439] |
| RU106-5 | [6, 32, 74, 100] | [−446 −214 198 430] |
| RU106-6 | [6, 32, 74, 100] | [−442 −210 202 434] |
| RU106-7 | [7, 33, 75, 101] | [−432 −200 212 444] |
| RU106-8 | [7, 33, 75, 101] | [−436 −204 208 440] |
| RU242-1 | [7, 33, 75, 101, 141, 167, 209, 235] | [−475 −371 −203 −99 93 197 365 469] |
| RU242-2 | [8, 34, 76, 102, 142, 168, 210, 236] | [−469 −365 −197 −93 99 203 371 475] |
| RU242-3 | [7, 33, 75, 101, 141, 167, 209, 235] | [−474 −370 −202 −98 94 198 366 470] |
| RU242-4 | [8, 34, 76, 102, 142, 168, 210, 236] | [−468 −364 −196 −92 100 204 372 476] |
| RU484-1 | [7, 33, 75, 101, 141, 167, 209, 235, 250, 276, 318, 344, 384, 410, 452, 478] | [−487 −435 −351 −299 −219 −167 −83 −31 31 83 167 219 299 351 435 487] |
| RU484-2 | | [−486 −434 −350 −298 −218 −166 −82 −30 32 84 168 220 300 352 436 488] |

Aspects of the present disclosure recognize that the robustness of the pilot tones against narrowband interference can be improved even further by more evenly distributing the pilot tones over the bandwidth of the wireless channel. For example, the bandwidth of the wireless channel can be subdivided into a number (N) of equal-sized portions so that a respective pilot tone can be assigned to each bandwidth portion for a given dRU. In some implementations, the distributed tone plan may assign N distributed pilots to the N bandwidth portions, respectively, after mapping the tones of a logical RU to noncontiguous subcarrier indices associated with a dRU. In such implementations, the relative locations of distributed pilots in the dRU may not depend on the relative locations of legacy pilots in the logical RU from which the tones of the dRU are mapped. As such, the distributed pilots can be more optimally distributed across the dRU spreading bandwidth.

Figure 11:
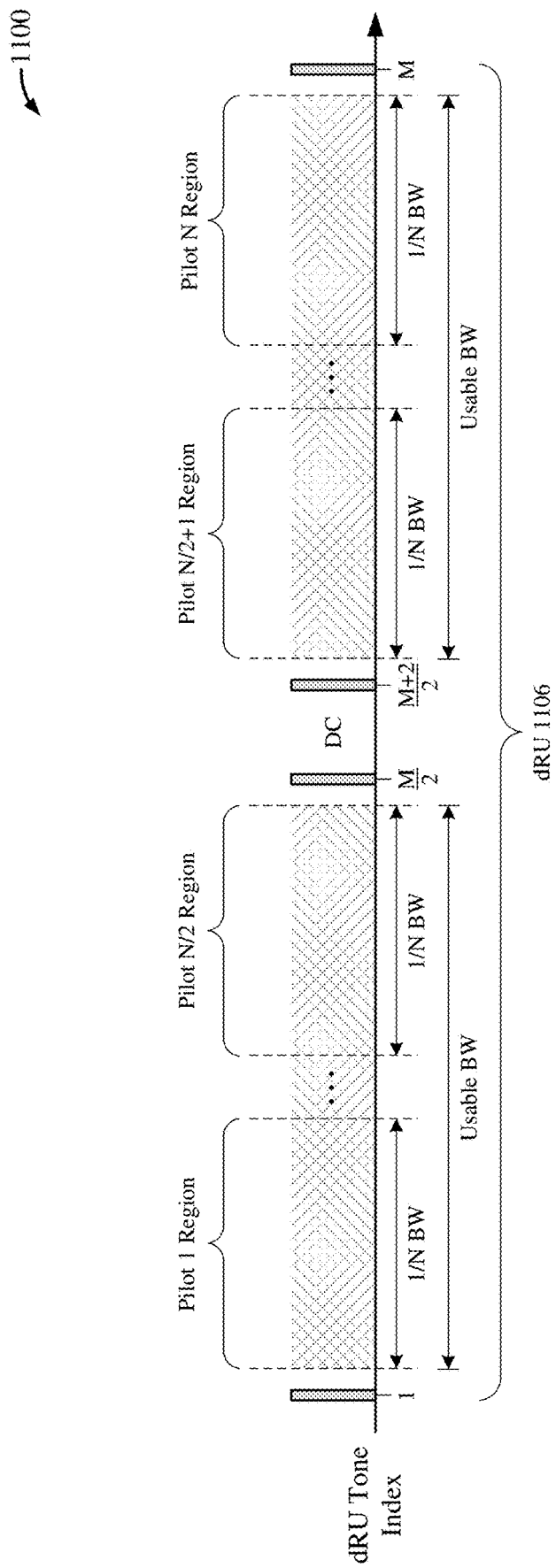
FIG. 11 shows a frequency diagram depicting an example model for assigning pilot tones in a dRU according to some implementations.

FIG. 11 shows a frequency diagram 1100 depicting an example model for assigning pilot tones in a dRU according to some implementations. More specifically, the frequency diagram 1100 shows an M-tone dRU 1106 having a number (N) of assigned pilot tones. The number of pilot tones N may be associated with a distributed tone plan used to map the M tones to M noncontiguous subcarrier indices associated with the dRU 1106. For simplicity, the M tones are identified by their relative tone indices 1-M in FIG. 11 (rather than their physical subcarrier indices).

In some aspects, the distributed tone plan may assign a fixed number of distributed pilots N for a given dRU spreading bandwidth. In other words, the number of distributed pilots N may remain the same for various numbers of tones M mapped to the same dRU spreading bandwidth. As such, the number of distributed pilots N may be different (such as greater or less) than a number (K) of legacy pilots associated with the logical RU from which the M tones are mapped (N≠K). For example, 4 distributed pilots (N=4) may be assigned to an 80 MHz dRU spreading bandwidth regardless of whether a 26-tone logical RU (K=2) or a 242-tone logical RU (K=8) is mapped to the 80 MHz bandwidth. Aspects of the present disclosure recognize that, when N>K, the additional pilot tones should not come at the cost of one or more data tones in the dRU. Thus, in some implementations, one or more of the N distributed pilots may be transmitted on "common" subcarrier indices that are different than the M noncontiguous subcarrier indices to which the M tones are mapped.

In some other aspects, the distributed tone plan may assign the same number of distributed pilots N to the dRU 1106 as the number of legacy pilots K associated with the logical RU from which the M tones are mapped (N=K). For example, when a 26-tone logical RU (K=2) is mapped to a 26-tone dRU, the distributed tone plan may assign 2 distributed pilots (N=2) to the resulting dRU. Because N=K, the N distributed pilots may be transmitted on a subset of the M noncontiguous subcarrier indices to which the M tones are mapped. In some implementations, the N distributed pilots may carry the same pilot sequence (or may be modulated with the same pilot values) as the K legacy pilots associated with the logical RU from which the M tones are mapped. In some implementations, the N distributed pilots also may be transmitted in a long training field (LTF) of the PPDU that is used to estimate the channel associated with the dRU 1106. In such implementations, the pilot sequence carried by the N distributed pilots may depend on the LTF sequence (such as defined by existing versions of the IEEE 802.11 standard).

In some aspects, the distributed tone plan may evenly distribute the N pilot tones across a bandwidth associated with the dRU 1106. Aspects of the present disclosure recognize that the tones nearest the carrier frequency (DC) and the tones nearest the edges of a wireless channel are most likely to be impaired and therefore may not be reliable for use in pilot tone transmissions. Thus, in some implementations, the "usable" bandwidth (BW) of the wireless channel may exclude one or more of the tones closest or adjacent to the edges of the wireless channel and also may exclude one or more of the tones closest or adjacent to DC. As used herein, the term "usable bandwidth" refers to any portion of the wireless channel in which a distributed pilot can be assigned.

As shown in FIG. 11, the usable bandwidth is subdivided into N pilot regions of equal size (each spanning $1/N^{th}$ of the total usable bandwidth). In some implementations, half of the N pilot tones may be assigned to N/2 subcarrier indices located below DC (also referred to as the "lower bandwidth portion") and the remaining half of the N pilot tones may be assigned to N/2 subcarrier indices located above DC (also referred to as the "upper bandwidth portion"). More specifically, each of the N pilot tones may be assigned to a subcarrier index located within a respective one of the N pilot regions. For example, the 1st pilot tone of the N pilot tones may be assigned to a subcarrier index located within the pilot 1 region and the $N^{th}$ pilot tone of the N pilot tones may be assigned to a subcarrier index located within the pilot N region.

In some implementations, the N/2 pilot tones assigned to the lower bandwidth portion may be transmitted on N/2 near-equidistantly spaced subcarrier indices located in the lower bandwidth portion and the N/2 pilot tones assigned to the upper bandwidth portion may be transmitted on N/2 near-equidistantly spaced subcarrier indices located in the upper bandwidth portion. As such, the N/2 pilot tones in the lower bandwidth portion may have the same relative tone positions in the first N/2 pilot regions, respectively, and the N/2 pilot tones in the upper bandwidth portion may have the same relative tone positions in the remaining N/2 pilot regions, respectively. Table 4 provides a summary of example suitable pilot tone spacings for dRUs of various sizes and various dRU spreading bandwidths.

TABLE 4

| Spreading BW | dRU26 Spacing | dRU52 Spacing | dRU106 Spacing | dRU242 Spacing | dRU484 Spacing |
|---|---|---|---|---|---|
| 20 MHz | 11 | 11, 14, 15 | 26, 30 | N/A | N/A |
| 40 MHz | 9, 10 | 13, 14, 15 | 28 | 26, 27, 31, 32 | N/A |
| 80 MHz | 8, 9 | 12, 17, 18 | 25, 30 | 30 | 30/31 |

In some implementations, the N pilot tones may be located symmetrically around DC. In other words, the N/2 subcarrier indices in the lower bandwidth portion may be located the same distance from DC as the N/2 subcarrier indices in the upper bandwidth portion. For example, if the $1^{st}$ pilot tone is transmitted on the lowest subcarrier index located in the pilot 1 region, then the $N^{th}$ pilot tone is transmitted on the highest subcarrier index located in the pilot N region. By assigning the N pilot tones symmetrically around DC, only half of the pilot tone locations need to be stored in memory.

In some other implementations, the N pilot tones may be located asymmetrically around DC. More specifically, each of the N subcarrier indices may be located the same distance from the lowest subcarrier index in each of the N pilot regions. For example, if the 1st pilot tone is transmitted on the lowest subcarrier index located in the pilot 1 region, then the $N^{th}$ pilot tone is transmitted on the lowest subcarrier index located in the pilot N region. Aspects of the present disclosure recognize that such pilot tone assignment may result in reduced peak-to-average power ratio (PAPR).

As described with reference to FIGS. 9A and 9B, lack of diversity between relative pilot tone locations in different RUs may cause the distributed pilots to be squeezed into localized regions of a dRU spreading bandwidth as a result of the interleaved tone mapping (such as described with reference to FIG. 8). Thus, in some implementations, the distributed tone plan may assign different relative pilot tone locations to different dRUs. Further, the physical pilot tone locations within a given dRU may depend on both the starting subcarrier index on which the dRU is transmitted and a dRU index (i) associated with the dRU (for i=1:n, where n is the number of dRUs that can be concurrently transmitted on a shared wireless channel). For example, if only two M-tone dRUs can be concurrently transmitted on a shared wireless channel, and the $1^{st}$ pilot tone of the first dRU is transmitted on the lowest subcarrier index located in the pilot 1 region of the first dRU, then the $1^{st}$ pilot tone of the second dRU may not be transmitted on the lowest subcarrier index located in the pilot 1 region of the second dRU.

Figure 12:
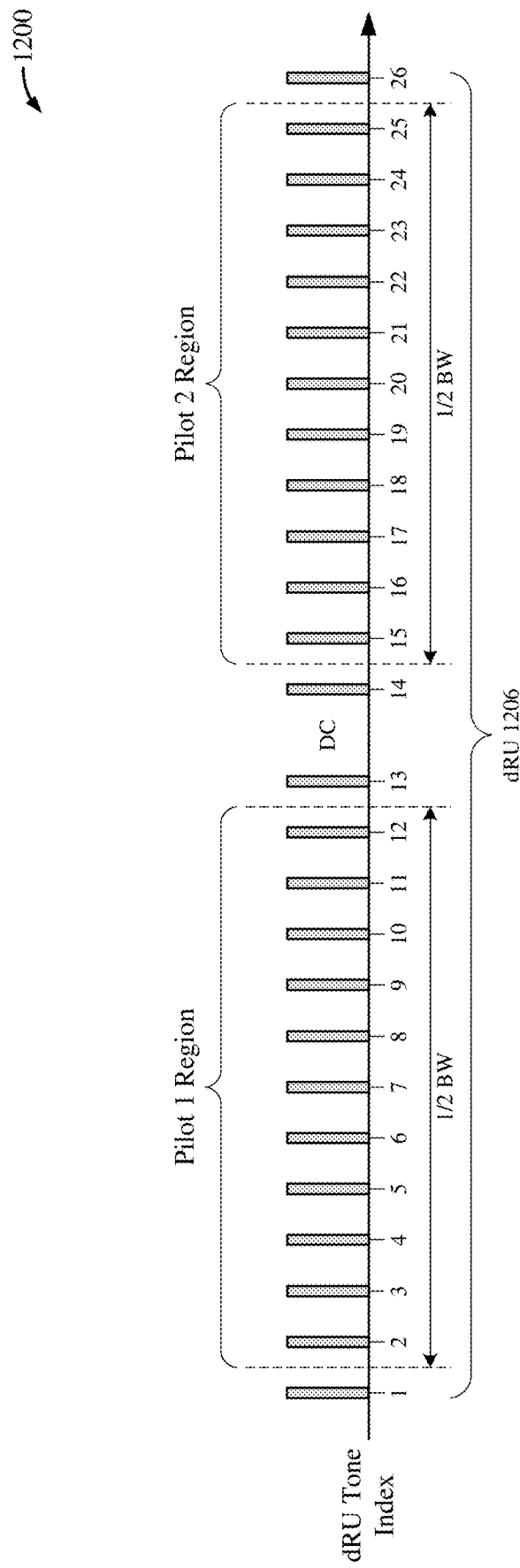
FIG. 12 shows a frequency diagram depicting example pilot tone candidates for a 26-tone dRU according to some implementations.

FIG. 12 shows a frequency diagram 1200 depicting example pilot tone candidates for a 26-tone dRU 1206 according to some implementations. As shown in FIG. 12, the 26 tones of the dRU 1206 are mapped to 26 noncontiguous subcarrier indices associated with a wireless channel. For simplicity, the 26 tones are identified by their relative tone indices 1-26, rather than their physical subcarrier indices, in FIG. 12. In some implementations, the dRU 1206 may be one example of the M-tone dRU 1106 of FIG. 11, where M=26 and N=2. As such, 2 distributed pilots may be assigned to the dRU 1206.

In the example of FIG. 12, tones 1, 13, 14, and 26 (located nearest DC and the edges of the dRU spreading bandwidth) are excluded as potential pilot tone candidates. The remaining usable bandwidth is subdivided into 2 pilot regions (each spanning ½ of the bandwidth) that coincide with the placement of the 2 pilot tones. For example, the pilot 1 region encompasses tones 2-12 located in the lower bandwidth portion of the dRU 1206 and the pilot 2 region encompasses tones 15-25 located in the upper bandwidth portion of the dRU 1206. As described above with reference to FIG. 11, a distributed tone plan may assign distributed pilots to relative tone positions in each of the 2 pilot regions based on the starting subcarrier index on which the dRU 1206 is transmitted and a dRU index associated with the dRU 1206.

According to the existing legacy tone plan, larger rRUs are constructed from multiple smaller rRUs. For example, a 52-tone rRU inherits its tone positions from two adjacent 26-tone rRUs spanning the same bandwidth as the 52-tone rRU. In some aspects, larger dRUs may inherent their pilot tone locations from multiple smaller dRUs according to a hierarchical structure. In other words, the pilot tone locations for all dRUs of various sizes may be inherited from the pilot tone locations associated with one or more 26-tone dRUs (P26). For example, a 52-tone dRU may inherit its pilot tone locations (P52) from two 26-tone dRUs (P52=2*P26), a 106-tone dRU may inherit its pilot tone locations (P106) from two 52-tone dRUs that are downsampled by a factor of 2 (P106=½(2*P52)), a 242-tone dRU may inherit its pilot tone locations (P242) from two 106-tone dRUs (P242=2*P106), and a 484-tone dRU may inherit its pilot tone locations (P484) from two 242-tone dRUs (P282=2*P242). In some implementations, the distributed tone plan may ensure an equitable distribution of pilot tones for dRUs of various sizes and for multiple dRUs that are mapped to a shared wireless channel.

Figure 13A:
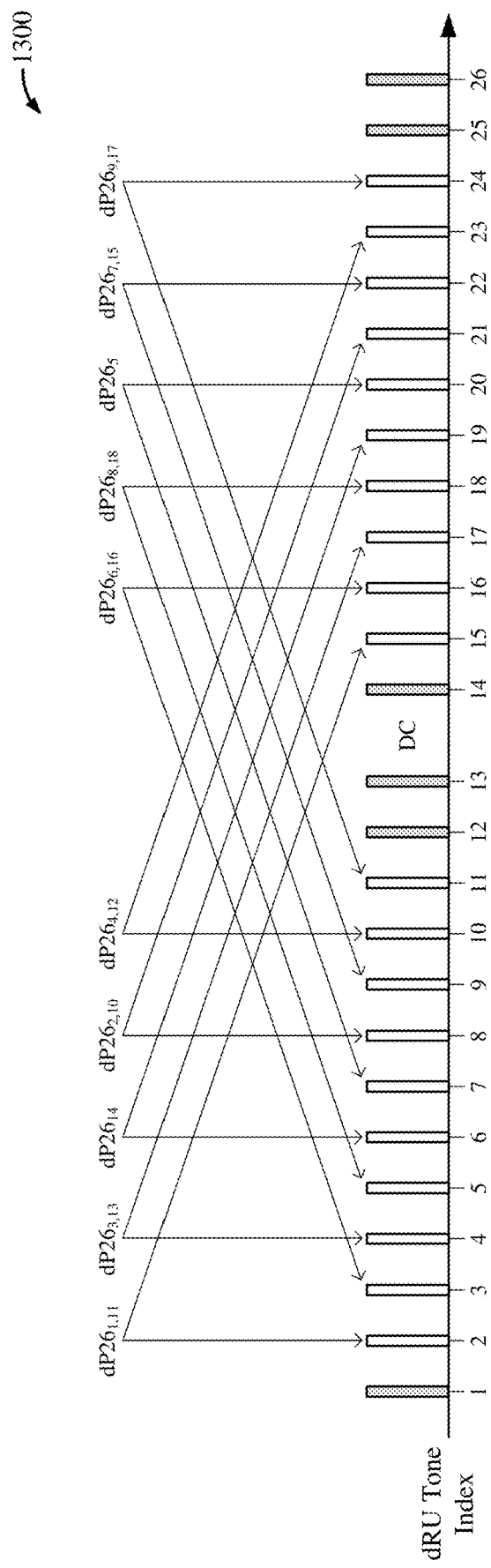
FIG. 13A shows a frequency diagram depicting an example pilot tone assignment for 26-tone dRUs according to some implementations.

FIG. 13A shows a frequency diagram 1300 depicting an example pilot tone assignment for 26-tone dRUs according to some implementations. In some implementations, each 26-tone dRU of FIG. 13A may be one example of the 26-tone dRU 1206 of FIG. 12. More specifically, FIG. 13A shows example relative pilot tone assignments (dP26$_1$-dP26$_{18}$) associated with 18 26-tone dRUs (dRU26$_1$-dRU26$_{18}$, respectively) that can be mapped to a 40 MHz wireless channel. In some implementations, the pilot tone assignments dP26$_1$-dP26$_{18}$ may be optimized for 26-tone dRUs in a manner that results in a substantially equitable distribution of pilot tones across all dRU sizes and dRU spreading bandwidths.

In the example of FIG. 13A, the pilot tones are located asymmetrically around DC. Further, tones 1, 12, 13, 14, 25, and 26 (located nearest DC and the edges of the dRU spreading bandwidth) are excluded as potential pilot tone candidates. As a result, only 10 unique relative pilot tone positions can be assigned to 18 dRUs. In other words, at least some of the dRUs must have the same relative pilot tone positions. In some implementations, the same relative pilot tone positions may be assigned to multiple dRUs that are located a sufficient distance apart according to the distributed tone plan. In such implementations, the spacing of the pilot tones may depend on the spacing of the starting subcarrier indices to which the dRUs are mapped.

As shown in FIG. 13A, relative pilot tone positions (2,15) are assigned to $dRU26_1$ and $dRU26_{11}$, relative pilot positions (3,16) are assigned to $dRU26_6$ and $dRU26_{16}$, relative pilot tone positions (4,17) are assigned to $dRU26_3$ and $dRU26_{13}$, relative pilot tone positions (5,18) are assigned to $dRU26_8$ and $dRU26_{18}$, relative pilot tone positions (6,19) is assigned to $dRU26_{14}$, relative pilot tone positions (7,20) is assigned to $dRU26_5$, relative pilot tone positions (8,21) are assigned to $dRU26_2$ and $dRU26_{10}$, relative pilot tone positions (9,22) are assigned to $dRU26_7$ and $dRU26_{15}$, relative pilot tone positions (10,23) are assigned to $dRU26_4$ and $dRU26_{12}$, and relative pilot tone positions (11,24) are assigned to $dRU26_9$ and $dRU26_{17}$.

Figure 13B:
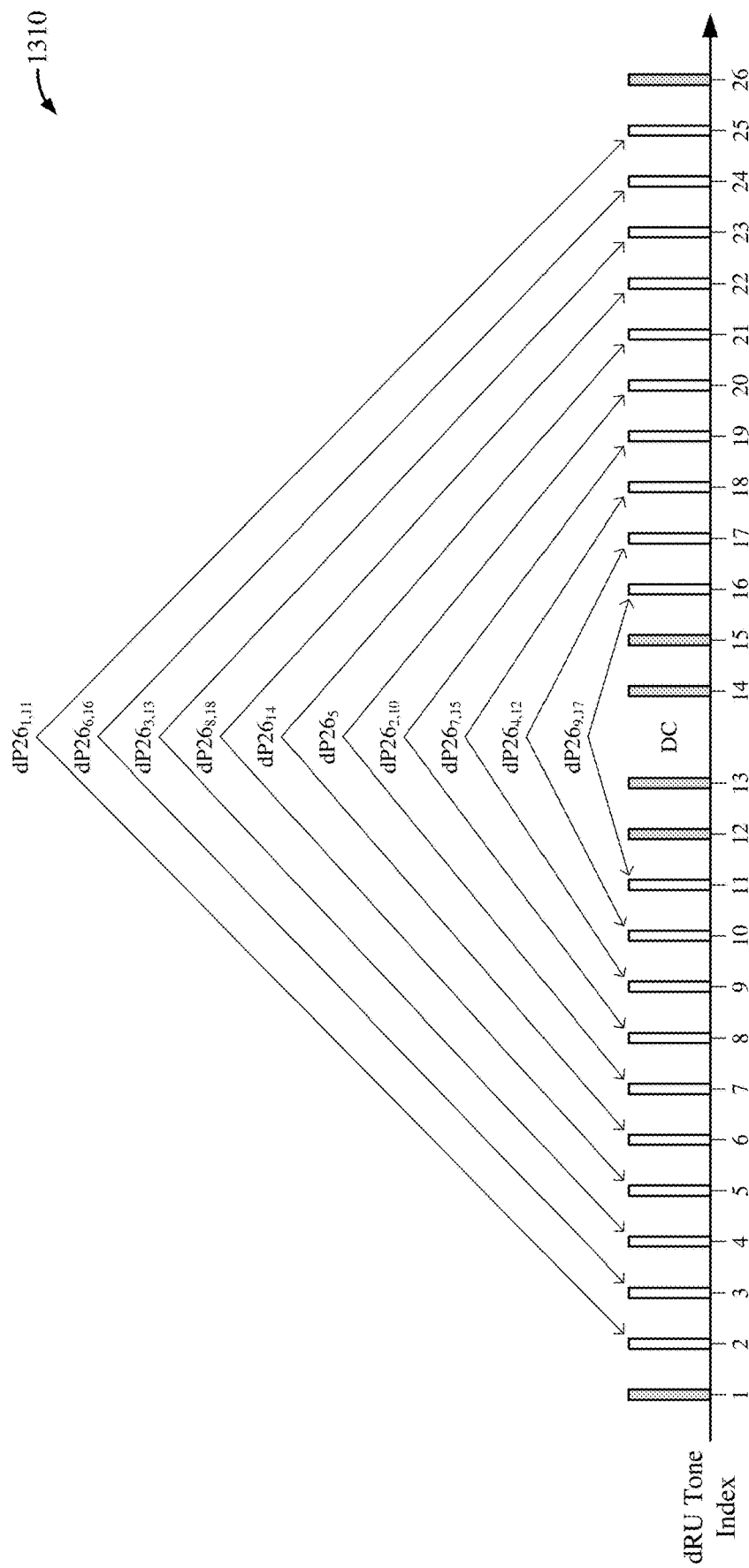
FIG. 13B shows another frequency diagram depicting an example pilot tone assignment for 26-tone dRUs according to some implementations.

FIG. 13B shows another frequency diagram 1310 depicting an example pilot tone assignment for 26-tone dRUs according to some implementations. In some implementations, each 26-tone dRU of FIG. 13B may be one example of the 26-tone dRU 1206 of FIG. 12. More specifically, FIG. 13B shows example relative pilot tone assignments ($dP26_1$-$dP26_{18}$) associated with 18 26-tone dRUs ($dRU26_1$-$dRU26_{18}$, respectively) that can be mapped to a 40 MHz wireless channel. In some implementations, the pilot tone assignments $dP26_1$-$dP26_{18}$ may be optimized for 26-tone dRUs in a manner that results in a substantially equitable distribution of pilot tones across all dRU sizes.

In the example of FIG. 13B, the pilot tones are located symmetrically around DC. Further, tones 1, 12, 13, 14, 15, and 26 (located nearest DC and the edges of the dRU spreading bandwidth) are excluded as potential pilot tone candidates. As a result, only 10 unique relative pilot tone positions can be assigned to 18 dRUs. In other words, at least some of the dRUs must have the same relative pilot tone positions. In some implementations, the same relative pilot tone positions may be assigned to multiple dRUs that are located a sufficient distance apart according to the distributed tone plan. In such implementations, the spacing of the pilot tones may depend on the spacing of the starting subcarrier indices to which the dRUs are mapped.

As shown in FIG. 13B, relative pilot tone positions (2,25) are assigned, in a DC-symmetric manner, to $dRU26_1$ and $dRU26_{11}$, relative pilot positions (3,24) are assigned to $dRU26_6$ and $dRU26_{16}$, relative pilot tone positions (4,23) are assigned to $dRU26_3$ and $dRU26_{13}$, relative pilot tone positions (5,22) are assigned to $dRU26_8$ and $dRU26_{18}$, relative pilot tone positions (6,21) is assigned to $dRU26_{14}$, relative pilot tone positions (7,20) is assigned to $dRU26_5$, relative pilot tone positions (8,19) are assigned to $dRU26_2$ and $dRU26_{10}$, relative pilot tone positions (9,18) are assigned to $dRU26_7$ and $dRU26_{15}$, relative pilot tone positions (10,17) are assigned to $dRU26_4$ and $dRU26_{12}$, and relative pilot tone positions (11,16) are assigned to $dRU26_9$ and $dRU26_{17}$.

Tables 5-7 provide a summary of example pilot tone assignments associated with various dRU sizes that are mapped to 20 MHz, 40 MHz, and 80 MHz dRU spreading bandwidths, respectively, in accordance with the hierarchical structure described with reference to FIGS. 12-13B.

TABLE 5

Relative Pilot Tone Indices for dRU in 20 MHz (Starting Tone Index = 1) (Non-DC Symmetric or DC Symmetric) Hierarchical Structure

| $dP26_i$, i = 1:9 | $dRU26_1$ | $dRU26_2$ | $dRU26_3$ | $dRU26_4$ | $dRU26_5$ | $dRU26_6$ | $dRU26_7$ | $dRU26_8$ | $dRU26_9$ |
|---|---|---|---|---|---|---|---|---|---|
| | (2, 15) | (8, 21) | (4, 17) | (10, 23) | (6, 20) | (3, 16) | (9, 22) | (5, 18) | (11, 25) |
| | or | or | or | or | or | or | or | or | or |
| | (2, 25) | (8, 19) | (4, 23) | (10, 17) | (6, 21) | (3, 24) | (9, 18) | (5, 22) | (11, 16) |
| $dP52_i$, i = 1:4 | $dRU52_1$ | | $dRU52_2$ | | | $dRU52_3$ | | $dRU52_4$ | |
| | [$dP26_1$ $dP26_2$] | | [$dP26_3$ $dP26_4$] | | | [$dP26_6$ $dP26_7$] | | [$dP26_8$ $dP26_9$] | |
| $dP106_i$, i = 2 | $dRU106_1$ | | | | | $dRU106_2$ | | | |
| | $dP52_1$ | | | | | $dP52_4$ | | | |

TABLE 6

Relative Pilot Tone Indices for dRU in 40 MHz (Starting Tone Index = 1) (Non-DC Symmetric or DC Symmetric) Hierarchical Structure

| $dP26_i$, i = 1:18 | $dRU26_1$ | $dRU26_2$ | $dRU26_3$ | $dRU26_4$ | $dRU26_5$ | $dRU26_6$ | $dRU26_7$ | $dRU26_8$ | $dRU26_9$ |
|---|---|---|---|---|---|---|---|---|---|
| | (2, 15) | (8, 21) | (4, 17) | (10, 23) | (6, 19) | (3, 16) | (9, 22) | (5, 18) | (11, 24) |
| | or | or | or | or | or | or | or | or | or |
| | (2, 25) | (8, 19) | (4, 23) | (10, 17) | (6, 21) | (3, 24) | (9, 18) | (5, 22) | (11, 16) |
| | $dRU26_{10}$ | $dRU26_{11}$ | $dRU26_{12}$ | $dRU26_{13}$ | $dRU26_{14}$ | $dRU26_{15}$ | $dRU26_{16}$ | $dRU26_{17}$ | $dRU26_{18}$ |
| | (8, 21) | (2, 15) | (10, 23) | (4, 17) | (7, 20) | (9, 22) | (3, 16) | (11, 24) | (5, 18) |
| | or | or | or | or | | or | or | or | or |
| | (8, 19) | (2, 25) | (10, 17) | (4, 23) | | (9, 18) | (3, 24) | (11, 16) | (5, 22) |
| $dP52_i$, i = 1:8 | $dRU52_1$ | | $dRU52_2$ | | | $dRU52_3$ | | $dRU52_4$ | |
| | [$dP26_1$ $dP26_2$] | | [$dP26_3$ $dP26_4$] | | | [$dP26_6$ $dP26_7$] | | [$dP26_8$ $dP26_9$] | |
| | $dRU52_5$ | | $dRU52_6$ | | | $dRU52_7$ | | $dRU52_8$ | |
| | [$dP26_{10}$ $dP26_{11}$] | | [$dP26_{12}$ $dP26_{13}$] | | | [$dP26_{15}$ $dP26_{16}$] | | [$dP26_{17}$ $dP26_{18}$] | |

TABLE 6-continued

Relative Pilot Tone Indices for dRU in 40 MHz (Starting Tone Index = 1) (Non-DC Symmetric or DC Symmetric) Hierarchical Structure

| | | | |
|---|---|---|---|
| $dP106_i$, i = 1:4 | $dRU106_1$ $dP52_1$ $dRU106_3$ $dP52_6$ | | $dRU106_2$ $dP52_3$ $dRU106_4$ $dP52_8$ |
| $dP242_i$, i = 1:2 | | $dRU242_1$ $[dP106_1\ dP106_2]$ $dRU242_2$ $[dP106_3\ dP106_4]$ | |

TABLE 7

Relative Pilot Tone Indices for dRU in 80 MHz (Starting Tone Index = 1) (Non-DC Symmetric or DC Symmetric) Hierarchical Structure

| | | | | | | | | |
|---|---|---|---|---|---|---|---|---|
| $dP6_i$, i = 1:37 | $dRU26_1$ (2, 15) or (2, 25) | $dRU26_2$ (8, 21) or (8, 19) | $dRU26_3$ (4, 17) or (4, 23) | $dRU26_4$ (10, 23) or (10, 17) | $dRU26_5$ (10, 23) or (10, 17) | $dRU26_6$ (3, 16) or (3, 24) | $dRU26_7$ (9, 22) or (9, 18) | $dRU26_8$ (5, 18) or (5, 22) | $dRU26_9$ (11, 24) or (11, 16) |
| | $dRU26_{10}$ (6, 19) or (6, 21) | $dRU26_{11}$ (12, 25) or (12, 15) | $dRU26_{12}$ (3, 16) or (3, 24) | $dRU26_{13}$ (9, 22) or (9, 18) | $dRU26_{14}$ (8, 21) or (8, 19) | $dRU26_{15}$ (5, 18) or (5, 22) | $dRU26_{16}$ (11, 24) or (11, 16) | $dRU26_{17}$ (2, 15) or (2, 25) | $dRU26_{18}$ (8, 21) or (8, 19) |
| | $dRU26_{20}$ (12, 25) or (12, 15) | $dRU26_{21}$ (7, 20) | $dRU26_{22}$ (10, 23) or (10, 17) | $dRU26_{23}$ (5, 18) or (5, 22) | $dRU26_{24}$ (5, 18) or (5, 22) | $dRU26_{25}$ (11, 24) or (11, 16) | $dRU26_{26}$ (6, 19) or (6, 21) | $dRU26_{27}$ (9, 22) or (9, 18) | $dRU26_{28}$ (3, 16) or (3, 24) |
| | $dRU26_{29}$ (8, 21) or (8, 19) | $dRU26_{30}$ (2, 15) or (2, 25) | $dRU26_{31}$ (12, 25) or (12, 15) | $dRU26_{32}$ (7, 20) | $dRU26_{33}$ (6, 19) or (6, 21) | $dRU26_{34}$ (9, 22) or (9, 18) | $dRU26_{35}$ (4, 17) or (4, 23) | $dRU26_{36}$ (11, 24) or (11, 16) | $dRU26_{37}$ (6, 19) or (6, 21) |
| $dP52_i$, i = 1:16 | $dRU52_1$ $[dP26_1\ dP26_2]$ $dRU52_5$ $[dP26_{10}\ dP26_{11}]$ $dRU52_9$ $[dP26_{20}\ dP26_{21}]$ $dRU52_{13}$ $[dP26_{29}\ dP26_{30}]$ | $dRU52_2$ $[dP26_3\ dP26_4]$ $dRU52_6$ $[dP26_{12}\ dP26_{13}]$ $dRU52_{10}$ $[dP26_{22}\ dP26_{23}]$ $dRU52_{14}$ $[dP26_{31}\ dP26_{32}]$ | | | $dRU52_3$ $[dP26_6\ dP26_7]$ $dRU52_7$ $[dP26_{15}\ dP26_{16}]$ $dRU52_{11}$ $[dP26_{25}\ dP26_{26}]$ $dRU52_{15}$ $[dP26_{34}\ dP26_{35}]$ | | $dRU52_4$ $[dP26_8\ dP26_9]$ $dRU52_8$ $[dP26_{17}\ dP26_{18}]$ $dRU52_{12}$ $[dP26_{27}\ dP26_{28}]$ $dRU52_{16}$ $[dP26_{36}\ dP26_{37}]$ | |
| $dP106_i$, i = 1:8 | | $dRU106_1$ $dP52_1$ $dRU106_3$ $dP52_5$ $dRU\ 106_5$ $dP52_{10}$ $dRU\ 106_7$ $dP52_{14}$ | | | | | $dRU106_2$ $dP52_3$ $dRU106_4$ $dP52_7$ $dRU106_6$ $dP52_{12}$ $dRU106_8$ $dP52_{16}$ | | |
| $dP242_i$, i = 1:4 | | | | $dRU242_1$ $[dP106_1\ dP106_2]$ $dRU242_2$ $[dP106_3\ dP106_4]$ $dRU242_3$ $[dP106_5\ dP106_6]$ $dRU242_4$ $[dP106_7\ dP106_8]$ | | | | | |
| $dP484_i$, i = 1:2 | | | | $dRU242_1$ $[dP242_1\ dP242_2]$ $dRU242_2$ $[dP242_3\ dP242_4]$ | | | | | |

Figure 14:
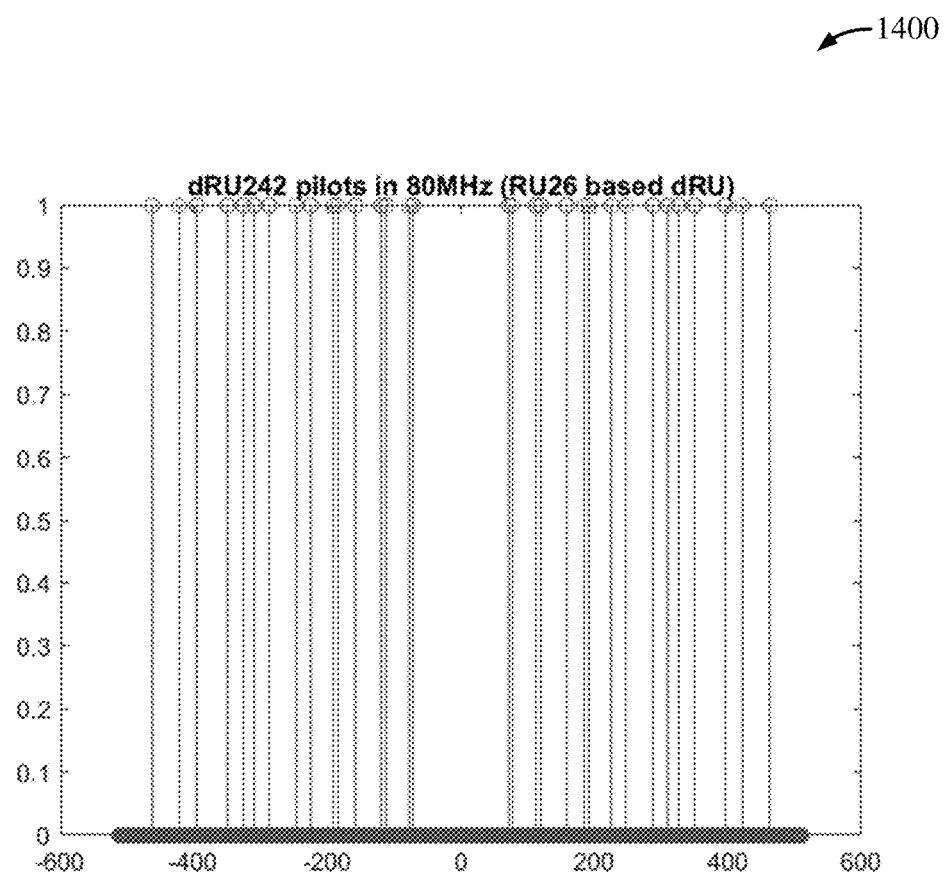
FIG. 14 shows a frequency diagram depicting an example distribution of pilot tones across a wireless channel in accordance with some implementations.

FIG. 14 shows a frequency diagram 1400 depicting an example distribution of pilot tones across a wireless channel in accordance with some implementations. More specifically, FIG. 14 shows the pilot tone locations assigned to 242-tone dRUs mapped to an 80 MHz wireless channel according to the hierarchical structure described above with reference to FIGS. 12-13B and Tables 5-7. Although the pilot tones are distributed over a relatively large range of frequencies, some portions of the wireless channel include a greater density of pilot tones than others. In other words, by ensuring a fairly equitable distribution of pilot tones across all dRU sizes, the dRU26-based hierarchical structure may not provide an optimal pilot tone assignment for any particular dRU size. In some aspects, a distributed tone plan may assign pilot tones to each dRU in a manner that is optimized for the given dRU size, for example, by maintaining equidistant spacing between the pilot tones in each dRU.

Figure 15:
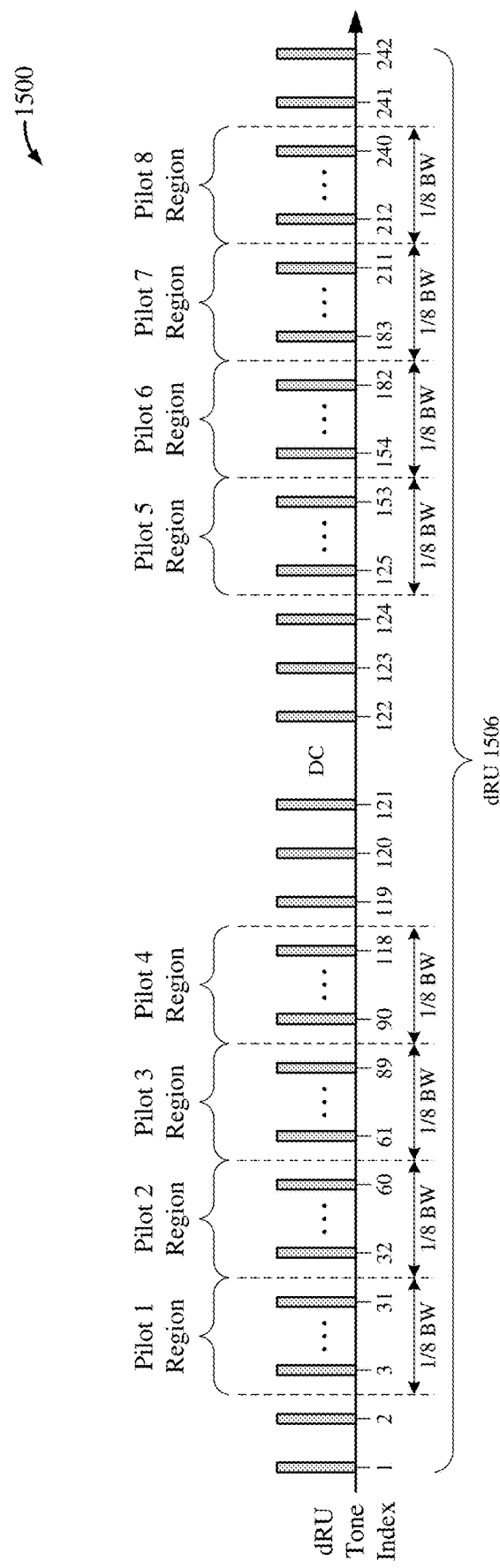
FIG. 15 shows a frequency diagram depicting example pilot tone candidates for a 242-tone dRU according to some implementations.

FIG. 15 shows a frequency diagram 1500 depicting example pilot tone candidates for a 242-tone dRU 1506 according to some implementations. As shown in FIG. 15, the 242 tones of the dRU 1506 are mapped to 242 noncontiguous subcarrier indices associated with a wireless channel. For simplicity, the 242 tones are identified by their relative tone indices 1-242, rather than their physical subcarrier indices, in FIG. 15. In some implementations, the dRU 1506 may be one example of the M-tone dRU 1106 of FIG. 11, where M=242 and N=8. As such, 8 distributed pilots may be assigned to the dRU 1506.

In the example of FIG. 15, tones 1, 2, 119, 120, 121, 122, 123, 124, 241, and 242 (located nearest DC and the edges of the dRU spreading bandwidth) are excluded as potential pilot tone candidates. The remaining usable bandwidth is subdivided into 8 pilot regions (each spanning $\frac{1}{8}^{th}$ of the bandwidth) that coincide with the placement of the 8 pilot tones. In the lower bandwidth portion of the dRU 1506, the pilot 1 region encompasses tones 3-31, the pilot 2 region encompasses tones 32-60, the pilot 3 region encompasses tones 61-89, and the pilot 4 region encompasses tones 90-118. In the upper bandwidth portion of the dRU 1506, the pilot 5 region encompasses tones 125-153, the pilot 6 region encompasses tones 154-182, the pilot 7 region encompasses tones 183-211, and the pilot 8 region encompasses tones 212-240. As described above with reference to FIG. 11, a distributed tone plan may assign distributed pilots to relative tone positions in each of the 8 pilot regions based on the starting subcarrier index on which the dRU 1506 is transmitted and a dRU index associated with the dRU 1506.

In some implementations, the distributed tone plan may ensure that the 4 pilot tones in the lower bandwidth portion of the dRU 1506 are equidistant from one another and that the 4 pilot tones in the upper bandwidth portion of the dRU 1506 are equidistant from one another. In such implementations, the 8 distributed pilots may be optimally assigned for the particular dRU 1506 (rather than hierarchically assigned based on the pilot tone locations in one or more 26-tone dRUs). As such, one or more of the pilot tone locations assigned to the dRU 1506 may be unique to 242-tone dRUs and thus may not overlap with the pilot tone locations assigned to any 26-tone dRUs that can be mapped to the same dRU spreading bandwidth as the dRU 1506. Although described in the context of a 242-tone dRU, the per-dRU pilot tone optimizations may be applicable to dRUs of any size. For example, one or more pilot tone locations assigned to a one or more pilot tone locations assigned to a 52-tone dRU may be unique to 52-tone dRUs, one or more pilot tone locations assigned to a 106-tone dRU may be unique to 106-tone dRUs, and one or more pilot tone locations assigned to a 484-tone dRU may be unique to 484-tone dRUs.

Figure 16A:
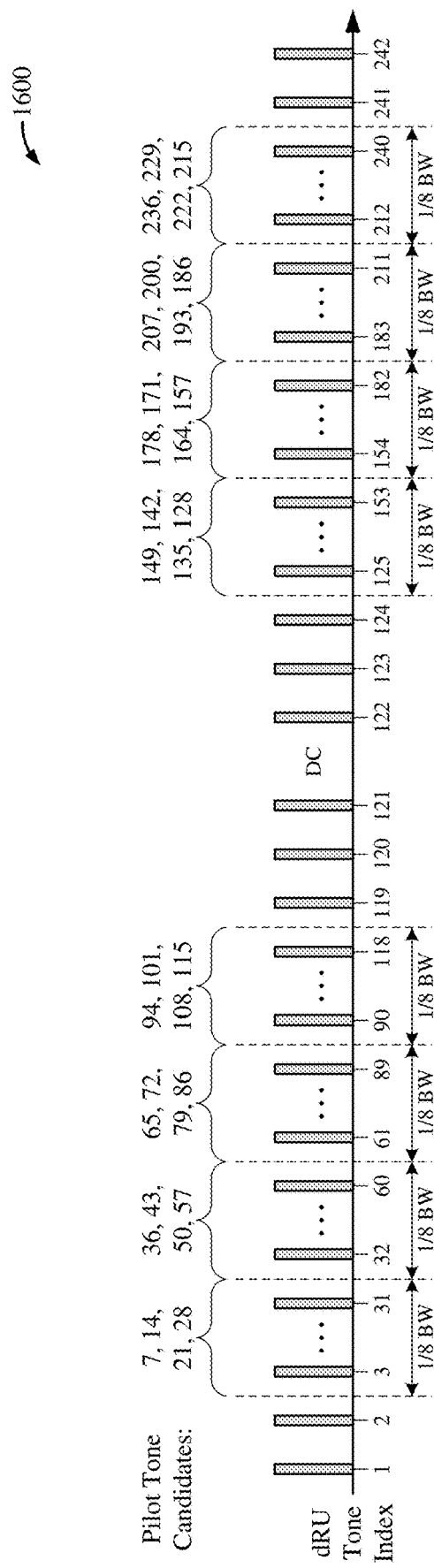
FIG. 16A shows a frequency diagram depicting an example pilot tone assignment for 242-tone dRUs according to some implementations.

FIG. 16A shows a frequency diagram 1600 depicting an example pilot tone assignment for 242-tone dRUs according to some implementations. In some implementations, each 242-tone dRU of FIG. 16A may be one example of the 242-tone dRU 1506 of FIG. 15. More specifically, FIG. 16A shows example relative pilot tone candidates associated with 4 242-tone dRUs that can be mapped to an 80 MHz wireless channel. In some implementations, the candidate pilot tone locations may be optimized for 242-tone dRUs in a manner that results in equidistant positioning of pilot tones among all 242-tone dRUs that can be mapped to a shared wireless channel.

In the example of FIG. 16A, the pilot tones are located symmetrically around DC. Further, tones 1, 2, 119, 120, 121, 122, 123, 124, 241, and 242 (located nearest DC and the edges of the dRU spreading bandwidth) are excluded as potential pilot tone candidates. As a result, 30 unique relative pilot tone positions can be assigned to 4 dRUs. Since the number of unique relative pilot tone positions is greater than the number of 242-tone dRUs that can be mapped to an 80 MHz channel, each dRU may have a different pilot tone offset. In other words, the relative pilot tone positions assigned to a first 242-tone dRU (dRU242$_1$) may be different than the relative pilot tone positions assigned to any of the remaining 242-tone dRUs (dRU242$_2$-dRU242$_4$), the relative pilot tone positions assigned to dRU242$_2$ may be different than the relative pilot tone positions assigned to any of dRU242$_1$, dRU2423, or dRU242$_4$, the relative pilot tone positions assigned to dRU2423 may be different than the relative pilot tone positions assigned to any of dRU242$_1$, dRU242$_2$, or dRU242$_4$, and the relative pilot tone positions assigned to dRU242$_4$ may be different than the relative pilot tone positions assigned to any of dRU242$_1$-dRU242$_4$.

As shown in FIG. 16A, relative pilot tone positions (7, 36, 65, 94, 149, 178, 207, 236) are assigned to dRU242$_1$, relative pilot positions (14, 43, 72, 101, 142, 171, 200, 229) are assigned to dRU242$_2$, relative pilot tone positions (21, 50, 79, 108, 135, 164, 193, 222) are assigned to dRU242$_3$, and relative pilot tone positions (28, 57, 86, 115, 128, 157, 186, 215) are assigned to dRU242$_4$. Accordingly, the 4 distributed pilots assigned to the lower bandwidth portion of each 242-tone dRU are equidistantly spaced (30 tones apart) and the 4 distributed pilots assigned to the upper bandwidth portion of each 242-tone dRU are equidistantly spaced (30 tones apart).

Figure 16B:
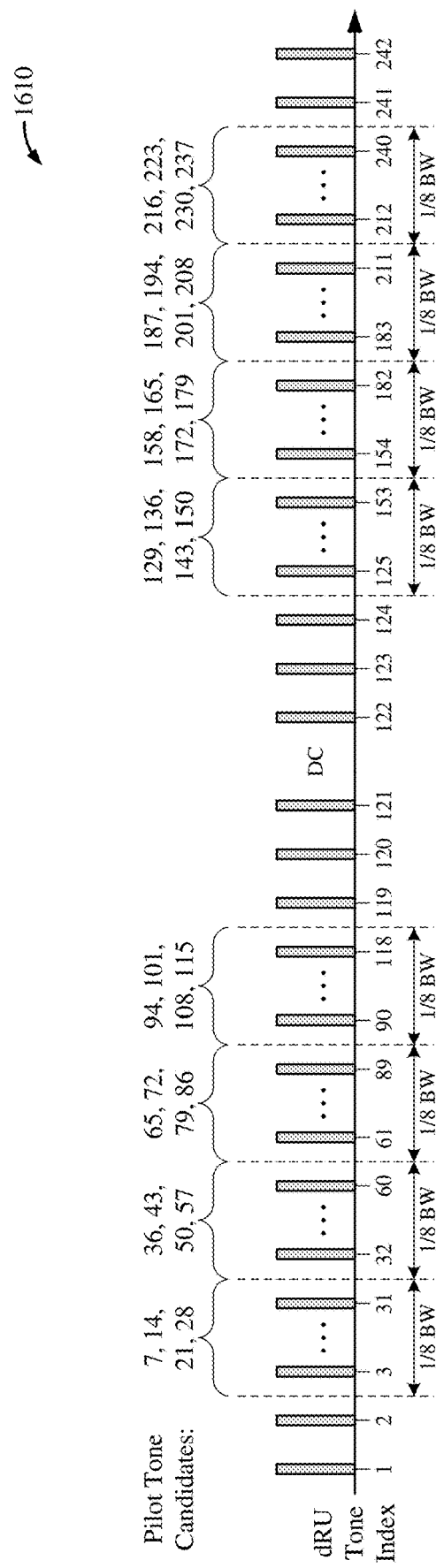
FIG. 16B shows another frequency diagram depicting an example pilot tone assignment for 242-tone dRUs according to some implementations.

FIG. 16B shows another frequency diagram 1610 depicting an example pilot tone assignment for 242-tone dRUs according to some implementations. In some implementations, each 242-tone dRU of FIG. 16B may be one example of the 242-tone dRU 1506 of FIG. 15. More specifically, FIG. 16B shows example relative pilot tone candidates associated with 4 242-tone dRUs that can be mapped to an 80 MHz wireless channel. In some implementations, the candidate pilot tone locations may be optimized for 242-tone dRUs in a manner that results in equidistant positioning of pilot tones among all 242-tone dRUs that can be mapped to a shared wireless channel.

In the example of FIG. 16B, the pilot tones are located asymmetrically around DC. Further, tones 1, 2, 119, 120, 121, 122, 123, 124, 241, and 242 (located nearest DC and the edges of the dRU spreading bandwidth) are excluded as potential pilot tone candidates. As a result, 30 unique relative pilot tone positions can be assigned to 4 dRUs. Since the number of unique relative pilot tone positions is greater than the number of 242-tone dRUs that can be mapped to an 80 MHz channel, each dRU may have a different pilot tone offset. In other words, the relative pilot tone positions assigned to a first 242-tone dRU (dRU242$_1$) may be different than the relative pilot tone positions assigned to any of the remaining 242-tone dRUs (dRU242$_2$-dRU242$_4$), the relative pilot tone positions assigned to dRU242$_2$ may be different than the relative pilot tone positions assigned to any of dRU242$_1$, dRU242$_3$, or dRU242$_4$, the relative pilot tone positions assigned to dRU242$_3$ may be different than the relative pilot tone positions assigned to any of dRU242$_1$, dRU242$_2$, or dRU242$_4$, and the relative pilot tone positions assigned to dRU242$_4$ may be different than the relative pilot tone positions assigned to any of dRU242$_1$-dRU242$_4$.

As shown in FIG. 16B, relative pilot tone positions (7, 36, 65, 94, 129, 158, 187, 216) are assigned to dRU242$_1$, relative pilot positions (14, 43, 72, 101, 136, 165, 194, 223) are assigned to dRU242$_2$, relative pilot tone positions (21, 50, 79, 108, 143, 172, 201, 230) are assigned to dRU242$_3$, and relative pilot tone positions (28, 57, 86, 115, 150, 179, 208, 237) are assigned to dRU242$_4$. Accordingly, the 4 distributed pilots assigned to the lower bandwidth portion of each 242-tone dRU are equidistantly spaced (30 tones apart) and the 4 distributed pilots assigned to the upper bandwidth portion of each 242-tone dRU are equidistantly spaced (30 tones apart).

Tables 8-10 provide a summary of example pilot tone assignments associated with various dRU sizes that are mapped to 20 MHz, 40 MHz, and 80 MHz dRU spreading bandwidths, respectively, in accordance with the per-dRU pilot tone optimization described with reference to FIGS. 15-16B.

TABLE 8

Relative Pilot Tone Indices for dRU in 20 MHz (Starting Tone Index = 1) (Non-DC Symmetric or DC Symmetric) per RU Size Optimization

| $dP26_i$, | $dRU26_1$ | $dRU26_2$ | $dRU26_3$ | $dRU26_4$ | $dRU26_5$ | $dRU26_6$ | $dRU26_7$ | $dRU26_8$ | $dRU26_9$ |
|---|---|---|---|---|---|---|---|---|---|
| i = 1:9 | (2, 15) | (4, 17) | (3, 16) | (5, 18) | (6, 20) | (8, 21) | (10, 23) | (9, 22) | (11, 25) |
| | or | or | or | or | or | or | or | or | or |
| | (2, 25) | (4, 23) | (3, 24) | (5, 22) | (6, 21) | (8, 19) | (10, 17) | (9, 18) | (11, 16) |
| $dP52_i$, | $dRU52_1$ | | $dRU52_2$ | | | $dRU52_3$ | | $dRU52_4$ | |
| i = 1:4 | (3, 15, 29, 41) | | (9, 21, 35, 47) | | | (6, 18, 32, 44) | | (12, 24, 39, 51) | |
| | or | | or | | | or | | or | |
| | (3, 15, 38, 50) | | (9, 21, 32, 44) | | | (6, 18, 35, 47) | | (12, 24, 29, 41) | |
| $dP106_i$, | $dRU106_1$ | | | | | $dRU106_2$ | | | |
| i = 2 | (8, 33, 62, 87) or (8, 33, 74, 99) | | | | | (21, 46, 75, 100) or (21, 46, 61, 86) | | | |

TABLE 9

Relative Pilot Tone Indices for dRU in 40 MHz (Starting Tone Index = 1) (Non-DC Symmetric or DC Symmetric) per RU Size Optimization

| $dP26_i$, | $dRU26_{1,2}$ | $dRU26_{3,4}$ | $dRU26_{5,14}$ | $dRU26_{6,7}$ | $dRU26_{8,9}$ |
|---|---|---|---|---|---|
| i = 1:18 | (3, 16) | (7, 20) | (11, 24) | (5, 18) | (9, 22) |
| | or | or | or | or | or |
| | (3, 24) | | (11, 16) | (5, 22) | (9, 18) |
| | $dRU26_{10,11}$ | $dRU26_{12,13}$ | | $dRU26_{15,16}$ | $dRU26_{17,18}$ |
| | (4, 17) | (8, 21) | | (6, 19) | (10, 23) |
| | or | or | | or | or |
| | (4, 23) | (8, 19) | | (6, 21) | (10, 17) |
| $dP52_i$, | $dRU52_1$ | $dRU52_2$ | | $dRU52_3$ | $dRU52_4$ |
| i = 1:8 | (3, 15, 29, 41) | (4, 16, 30, 42) | | (9, 21, 35, 47) | (10, 22, 36, 48) |
| | or | or | | or | or |
| | (3, 15, 38, 50) | (4, 16, 37, 49) | | (9, 21, 32, 44) | (10, 22, 31, 43) |
| | $dRU52_5$ | $dRU52_6$ | | $dRU52_7$ | $dRU52_8$ |
| | (6, 18, 32, 44) | (7, 19, 33, 45) | | (12, 24, 38, 50) | (13, 25, 39, 51) |
| | or | or | | or | or |
| | (6, 18, 35, 47) | (7, 19, 34, 46) | | (12, 24, 29, 41) | (13, 25, 28, 40) |
| $dP106_i$, | $dRU106_1$ | | | $dRU106_2$ | |
| i = 1:4 | (6, 31, 60, 85) or (6, 31, 76, 101) | | | (18, 43, 72, 97) or (18, 43, 64, 89) | |
| | $dRU106_3$ | | | $dRU106_4$ | |
| | (12, 37, 66, 91) or (12, 37, 70, 95) | | | (24, 49, 78, 103) or (24, 49, 58, 83) | |
| $dP242_i$, | | | $dRU242_1$ | | |
| i = 1:2 | (10, 39, 68, 97, 132, 161, 190, 219) or (10, 39, 68, 97, 146, 175, 204, 233) | | | | |
| | $dRU242_2$ | | | | |
| | (25, 54, 83, 112, 147, 176, 205, 234) or (25, 54, 83, 112, 131, 160, 189, 218) | | | | |

TABLE 10

Relative Pilot Tone Indices for dRU in 80 MHz (Starting Tone Index = 1) (Non-DC Symmetric or DC Symmetric) per RU Size Optimization

| $dP6_i$, | $dRU26_{1-4}$ | | $dRU26_5$ | $dRU26_{6-9}$ |
|---|---|---|---|---|
| i = 1:37 | (8, 21) | | (8, 21) | (7, 20) |
| | or | | or | |
| | (8, 19) | | (8, 19) | |
| | $dRU26_{10-13}$ | | $dRU26_{14}$ | $dRU26_{15-18}$ |
| | (10, 23) | | (9, 22) | (9, 22) |
| | or | | or | or |
| | (10, 17) | | (9, 18) | (9, 18) |
| | $dRU26_{20-23}$ | | $dRU26_{24}$ | $dRU26_{25-28}$ |
| | (4, 17) | | (4, 17) | (3, 16) |
| | or | | or | or |
| | (4, 23) | | (4, 23) | (3, 24) |
| | $dRU26_{29-32}$ | | $dRU26_{33}$ | $dRU26_{34-37}$ |
| | (6, 19) | | (5, 18) | (5, 18) |
| | or | | or | or |
| | (6, 21) | | (5, 22) | (5, 22) |
| $dP52_i$, | $dRU52_1$ | $dRU52_2$ | $dRU52_3$ | $dRU52_4$ |
| i = 1:16 | (3, 15, 29, 41) | (4, 16, 30, 42) | (2, 14, 28, 40) | (3, 15, 29, 41) |
| | or | or | or | or |
| | (3, 15, 38, 50) | (4, 16, 37, 49) | (2, 14, 39, 51) | (3, 15, 38, 50) |
| | $dRU52_5$ | $dRU52_6$ | $dRU52_7$ | $dRU52_8$ |

TABLE 10-continued

Relative Pilot Tone Indices for dRU in 80 MHz (Starting Tone
Index = 1) (Non-DC Symmetric or DC Symmetric) per RU Size Optimization

|  |  |  |  |  |
|---|---|---|---|---|
|  | (8, 20, 34, 46) | (9, 21, 35, 47) | (9, 21, 35, 47) | (10, 22, 36, 48) |
|  | or | or | or | or |
|  | (8, 20, 33, 45) | (9, 21, 32, 44) | (9, 21, 32, 44) | (10, 22, 31, 43) |
|  | $dRU52_9$ | $dRU52_{10}$ | $dRU52_{11}$ | $dRU52_{12}$ |
|  | (6, 18, 32, 44) | (7, 19, 33, 45) | (5, 17, 31, 43) | (6, 18, 32, 44) |
|  | or | or | or | or |
|  | (6, 18, 35, 47) | (7, 19, 34, 46) | (5, 17, 36, 48) | (6, 18, 35, 47) |
|  | $dRU52_{13}$ | $dRU52_{14}$ | $dRU52_{15}$ | $dRU52_{16}$ |
|  | (11, 23, 37, 49) | (12, 24, 38, 50) | (12, 24, 38, 50) | (13, 25, 39, 51) |
|  | or | or | or | or |
|  | (11, 23, 30, 42) | (12, 24, 29, 41) | (12, 24, 29, 41) | (13, 25, 28, 40) |
| $dP106_i$, | | $dRU106_1$ | | $dRU106_2$ |
| i = 1:8 | (4, 29, 58, 83) or (4, 29, 78, 103) | | (16, 41, 70, 95) or (16, 41, 66, 91) | |
|  | $dRU106_3$ | | $dRU106_4$ | |
|  | (22, 47, 76, 101) or (22, 47, 60, 85) | | (10, 35, 64, 89) or (10, 35, 72, 97) | |
|  | $dRU106_5$ | | $dRU106_6$ | |
|  | (7, 32, 61, 86) or (7, 32, 75, 100) | | (19, 44, 73, 98) or (19, 44, 63, 88) | |
|  | $dRU106_7$ | | $dRU106_8$ | |
|  | (25, 50, 79, 104) or (25, 50, 57, 82) | | (13, 38, 67, 92) or (13, 38, 69, 94) | |
| $dP242_i$, | | $dRU242_1$ | | |
| i = 1:4 | (7, 36, 65, 94, 129, 158, 187, 216) or (7, 36, 65, 94, 149, 178, 207, 236) | | | |
|  | $dRU242_2$ | | | |
|  | (21, 50, 79, 108, 143, 172, 201, 230) or (21, 50, 79, 108, 135, 164, 193, 222) | | | |
|  | $dRU242_3$ | | | |
|  | (14, 43, 72, 101, 136, 165, 194, 223) or (14, 43, 72, 101, 142, 171, 200, 229) | | | |
|  | $dRU242_4$ | | | |
|  | (28, 57, 86, 115, 150, 179, 208, 237) or (28, 57, 86, 115, 128, 157, 186, 215) | | | |
| $dP484_i$, | | $dRU242_1$ | | |
| i = 1:2 | (9, 39, 69, 99, 129, 159, 189, 219, 251, 281, 311, 341, 371, 401, 431, 461) | | | |
|  | or | | | |
|  | (9, 39, 69, 99, 129, 159, 189, 219, 266, 296, 326, 356, 386, 416, 446, 476) | | | |
|  | $dRU242_2$ | | | |
|  | (24, 54, 84, 114, 144, 174, 204, 234, 266, 296, 326, 356, 386, 416, 446, 476) | | | |
|  | or | | | |
|  | (24, 54, 84, 114, 144, 174, 204, 234, 251, 281, 311, 341, 371, 401, 431, 461) | | | |

Figure 17:
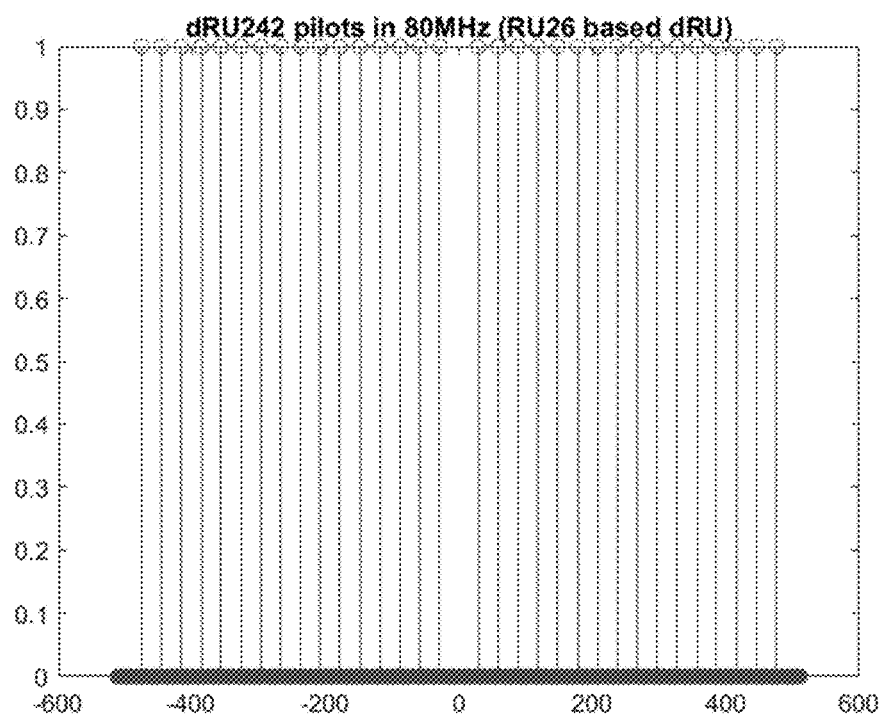
FIG. 17 shows a frequency diagram depicting an example distribution of pilot tones across a wireless channel in accordance with some implementations.
Figure 18A:
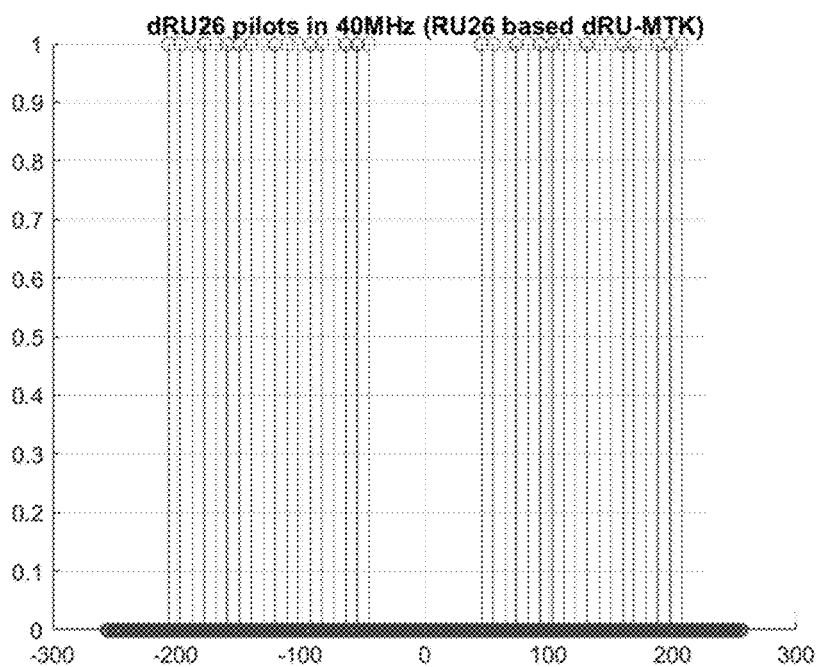
FIGS. 18A-18D show frequency diagrams depicting example distributions of pilot tones across a wireless channel in accordance with some implementations.
Figure 18B:
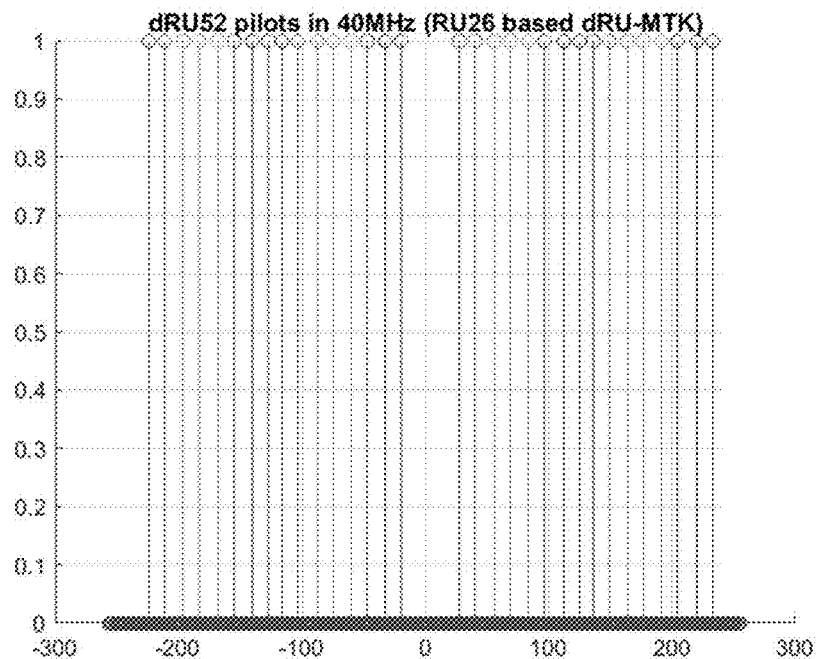
Figure 18C:
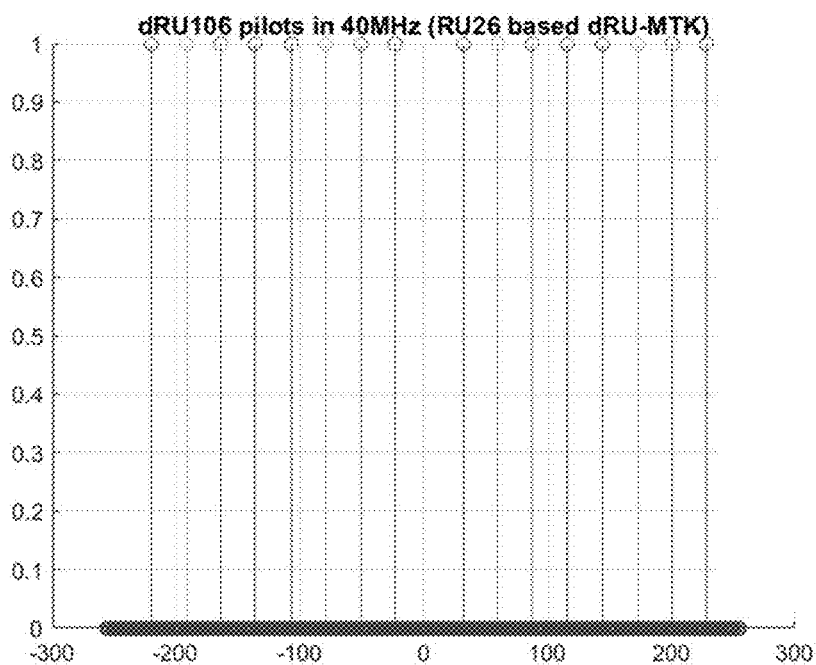
Figure 18D:
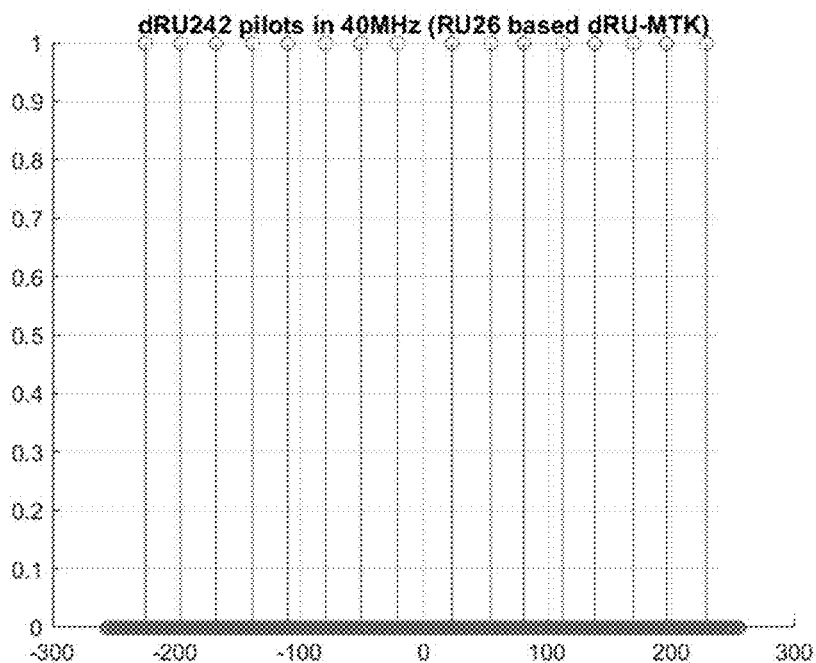

FIG. 17 shows a frequency diagram 1700 depicting an example distribution of pilot tones across a wireless channel in accordance with some implementations. More specifically, FIG. 17 shows the pilot tone locations assigned to 242-tone dRUs mapped to an 80 MHz wireless channel according to the per-dRU pilot tone optimization described above with reference to FIGS. 15-16B and Tables 8-10. Compared to the pilot tone distribution depicted in FIG. 14, the per-dRU pilot tone optimization results in a more even distribution of pilot tones across the bandwidth of the wireless channel. As such, pilot tone assignments depicted in FIG. 17 may be even more robust against narrowband interference than the pilot tone assignments depicted in FIG. 14.

Tables 11-13 provide a summary of example pilot tone indices associated with the relative pilot tone locations indicated by Tables 8-10, respectively. FIGS. 18A-18D show frequency diagrams 1800-1830, respectively, depicting example distributions of pilot tones across a wireless channel in accordance with some implementations. More specifically, FIG. 18A-18D shows the pilot tone locations assigned to 26-tone dRUs, 52-tone dRUs, 106-tone dRUs, and 242-tone dRUs, respectively, mapped to a 40 MHz wireless channel according to the per-dRU pilot tone optimization described above with reference to FIGS. 15-16B and Tables 8-13.

TABLE 11

Pilot Indices for dRU Transmission over 20 MHz

| dRU size | $KdRxx\_i$ |
|---|---|
| $dRU26_i$, i = 1:9 | {−111 15}, {−89 37}, {−100 26}, {−78 48}, {−67 59}, {−56 70}, {−34 92}, {−45 81}, {−23 103} |
| $dRU52_i$, i = 1:4 | {−111 −57 15 69}, {−82 −28 44 98}, {−97 −43 29 83}, {−68 −14 58 112} |
| $dRU106_i$, i = 1:2 | {−105 −48 21 78}, {−74 −18 49 106} |

TABLE 12

Pilot indices for dRU transmission over 40MHz

| dRU size | $KdRxx\_i$ |
|---|---|
| $dRU26_i$, i = 1:18 | {−206 46}, {−197 55}, {−130 122}, {−121 131}, {−45 207}, {−168 84}, {−159 93}, {−92 160}, {−83 169}, {−187 65}, {−178 74}, {−111 141}, {−102 150}, {−54 198}, {−149 103}, {−140 112}, {−73 179}, {−64 188} |
| $dRU52_i$, i = 1:8 | {−224 −116 28 136}, {−211 −103 41 149}, {−168 −60 84 192}, {−155 −47 97 205}, {−196 −88 56 164}, {−183 −75 69 177}, {−140 −32 112 220}, {−127 −19 125 233} |
| $dRU106_i$, i = 1:4 | {−220 −107 32 145}, {−164 −51 88 201}, {−192 −79 60 173}, {−136 −23 116 229} |
| $dRU242_i$, i = 1:2 | {−225 −168 −110 −51 23 81 138 196}, {−196 −138 −79 −21 54 112 170 229} |

TABLE 13

Pilot indices for dRU transmission over 80 MHz

| dRU size | KdRxx_i |
|---|---|
| dRU52$_i$, i = 1:16 | {−447 −231 53 269}, {−423 −207 77 293}, {−463 −247 37 253}, {−435 −219 65 281}, {−353 −137 147 363}, {−325 −109 175 391}, {−337 −121 163 379}, {−313 −97 187 403}, {−394 −178 106 322}, {−366 −150 134 350}, {−406 −190 94 310}, {−382 −166 118 334}, {−296 −80 204 420}, {−272 −56 228 444}, {−284 −68 216 432}, {−256 −40 244 460} |
| dRU106$_i$, i = 1:8 | {−467 −243 53 277}, {−355 −131 165 389}, {−297 −73 219 443}, {−409 −185 107 331}, {−438 −214 78 306}, {−326 −102 190 418}, {−272 −44 248 472}, {−384 −156 136 360} |
| dRU242$_i$, i = 1:4 | {−475 −359 −243 −127 45 161 277 393}, {−417 −301 −185 −69 103 219 335 451}, {−446 −330 −214 −98 74 190 306 422}, {−388 −272 −156 −40 132 248 364 480} |
| dRU484$_i$, i = 1:2 | {−483 −423 −363 −303 −243 −183 −123 −63 33 93 153 213 273 333 393 453}, {−452 −392 −332 −272 −212 −152 −92 −32 64 124 184 244 304 364 424 484} |

Figure 19:
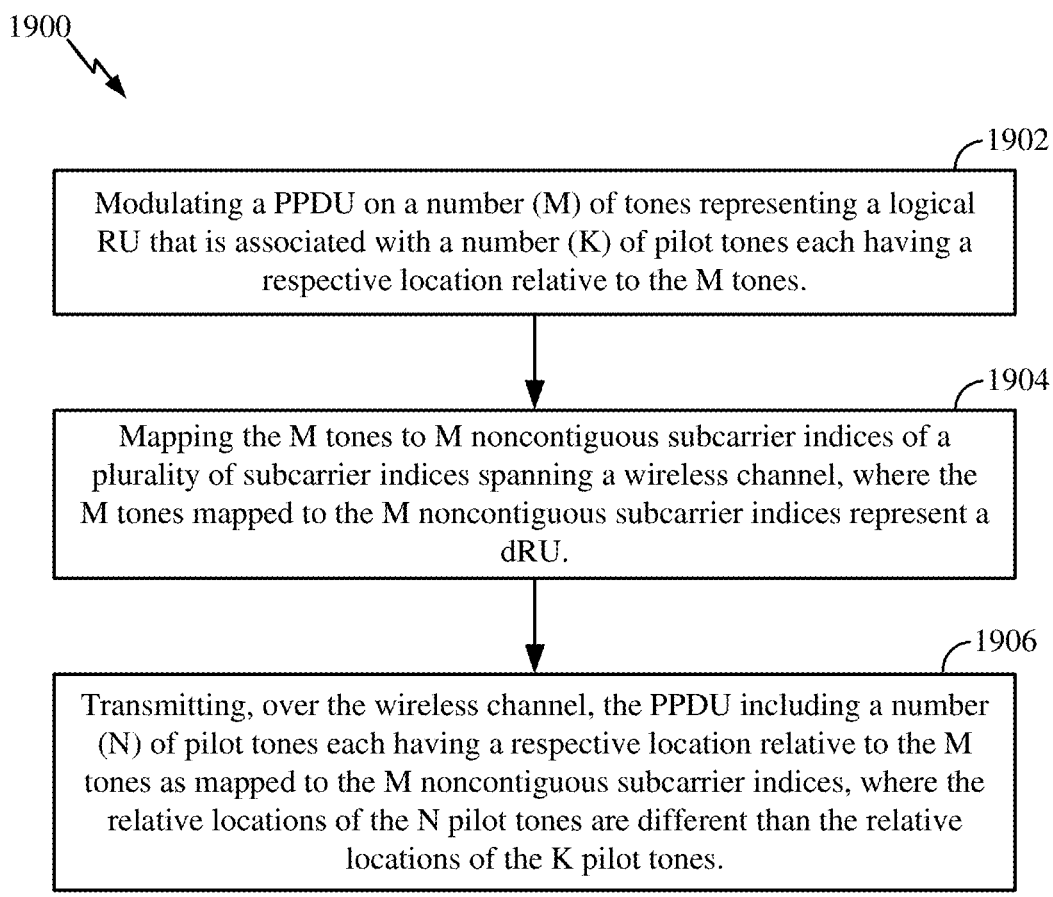
FIG. 19 shows a flowchart illustrating an example process for wireless communication that supports pilot tones in dRU transmissions according to some implementations.

FIG. 19 shows a flowchart illustrating an example process 1900 for wireless communication that supports pilot tones in dRU transmissions according to some implementations. In some implementations, the process 1900 may be performed by a wireless communication device operating as or within an AP, such as one of the APs 102 or 502 described above with reference to FIGS. 1 and 5A, respectively. In some other implementations, the process 1900 may be performed by a wireless communication device operating as or within a network node, such as one of the STAs 104 or 504 described above with reference to FIGS. 1 and 5B, respectively.

In some implementations, the process 1900 begins in block 1902 with modulating a PPDU on a number (M) of tones representing a logical RU that is associated with a number (K) of pilot tones each having a respective location relative to the M tones. In block 1904, the process 1900 proceeds with mapping the M tones to M noncontiguous subcarrier indices of a plurality of subcarrier indices spanning a wireless channel, where the M tones mapped to the M noncontiguous subcarrier indices represent a dRU. In block 1906, the process 1900 proceeds with transmitting, over the wireless channel, the PPDU including a number (N) of pilot tones each having a respective location relative to the M tones as mapped to the M noncontiguous subcarrier indices, where the relative locations of the N pilot tones are different than the relative locations of the K pilot tones.

In some aspects, N may be different than K. In some other aspects, N may be equal to K. In some implementations, the N pilot tones may carry the same values as the K pilot tones. In some implementations, M=26 and the mapping of the M tones to the M noncontiguous subcarrier indices may change the relative locations of the K pilot tones, where the N pilot tones represent the K pilot tones as a result of the mapping. In some implementations, the mapping of the M tones to the M noncontiguous subcarrier indices may shift the relative locations of the K pilot tones by −3 or +3.

In some aspects, the relative locations of the N pilot tones may be associated with N subcarrier indices of the plurality of subcarrier indices. In some implementations, the N subcarrier indices may be located symmetrically around a center frequency associated with the wireless channel. In some other implementations, the N subcarrier indices may be located asymmetrically around a center frequency associated with the wireless channel. In some implementations, the N subcarrier indices may include N/2 equidistant subcarrier indices located above a carrier frequency associated with the wireless channel and may include N/2 equidistant subcarrier indices located below the carrier frequency.

In some implementations, each of the N subcarrier indices may represent a respective pilot tone location associated with a 26-tone dRU. In some other implementations, at least one of the N subcarrier indices may represent a pilot tone location that is unique to M-tone dRUs. In some implementations, each of the N subcarrier indices may be located a respective distance from a starting subcarrier index of the M noncontiguous subcarrier indices based on a location of a starting subcarrier index relative to the wireless channel and a dRU index associated with the dRU.

Figure 20:
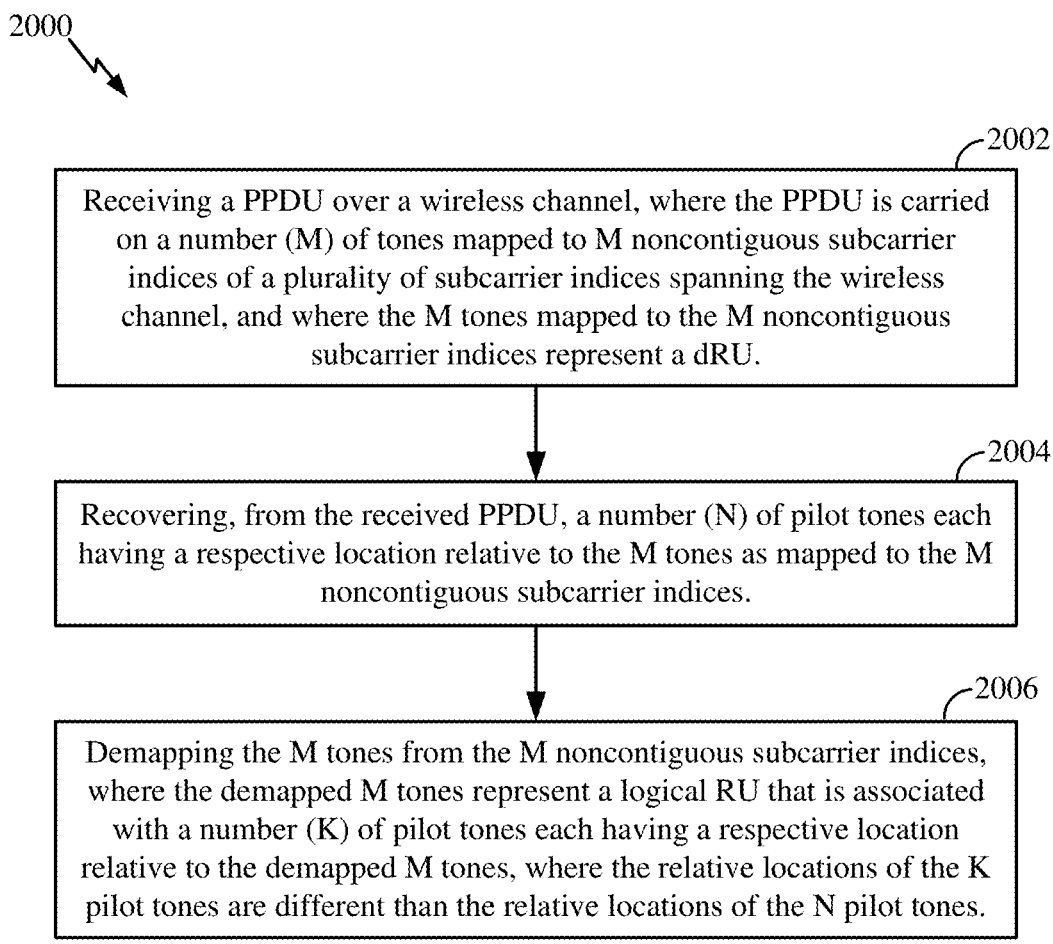
FIG. 20 shows a flowchart illustrating an example process for wireless communication that supports pilot tones in dRU transmissions according to some implementations.

FIG. 20 shows a flowchart illustrating an example process 2000 for wireless communication that supports pilot tones in dRU transmissions according to some implementations. In some implementations, the process 2000 may be performed by a wireless communication device operating as or within an AP, such as one of the APs 102 or 502 described above with reference to FIGS. 1 and 5A, respectively. In some other implementations, the process 2000 may be performed by a wireless communication device operating as or within a network node, such as one of the STAs 104 or 504 described above with reference to FIGS. 1 and 5B, respectively.

In some implementations, the process 2000 begins in block 2002 with receiving a PPDU over a wireless channel, where the PPDU is carried on a number (M) of tones mapped to M noncontiguous subcarrier indices of a plurality of subcarrier indices spanning the wireless channel, and where the M tones mapped to the M noncontiguous subcarrier indices represent a dRU. In block 2004, the process 2000 proceeds with recovering, from the received PPDU, a number (N) of pilot tones each having a respective location relative to the M tones as mapped to the M noncontiguous subcarrier indices. In block 2006, the process 2000 proceeds with demapping the M tones from the M noncontiguous subcarrier indices, where the demapped M tones represent a logical RU that is associated with a number (K) of pilot tones each having a respective location relative to the demapped M tones, where the relative locations of the K pilot tones are different than the relative locations of the N pilot tones.

In some aspects, N may be different than K. In some other aspects, N may be equal to K. In some implementations, the N pilot tones may carry the same values as the K pilot tones. In some implementations, M=26 and the demapping of the M tones to the M noncontiguous subcarrier indices may change the relative locations of the N pilot tones, where the K pilot tones represent the N pilot tones as a result of the mapping. In some implementations, the demapping of the M tones to the M noncontiguous subcarrier indices may shift the relative locations of the N pilot tones by −3 or +3.

In some aspects, the relative locations of the N pilot tones may be associated with N subcarrier indices of the plurality of subcarrier indices. In some implementations, the N subcarrier indices may be located symmetrically around a center frequency associated with the wireless channel. In some other implementations, the N subcarrier indices may be located asymmetrically around a center frequency associated with the wireless channel. In some implementations, the N subcarrier indices may include N/2 equidistant subcarrier indices located above a carrier frequency associated with the wireless channel and may include N/2 equidistant subcarrier indices located below the carrier frequency.

In some implementations, each of the N subcarrier indices may represent a respective pilot tone location associated with a 26-tone dRU. In some other implementations, at least one of the N subcarrier indices may represent a pilot tone location that is unique to M-tone dRUs. In some implementations, each of the N subcarrier indices may be located a respective distance from a starting subcarrier index of the M noncontiguous subcarrier indices based on a location of a starting subcarrier index relative to the wireless channel and a dRU index associated with the dRU.

Figure 21:
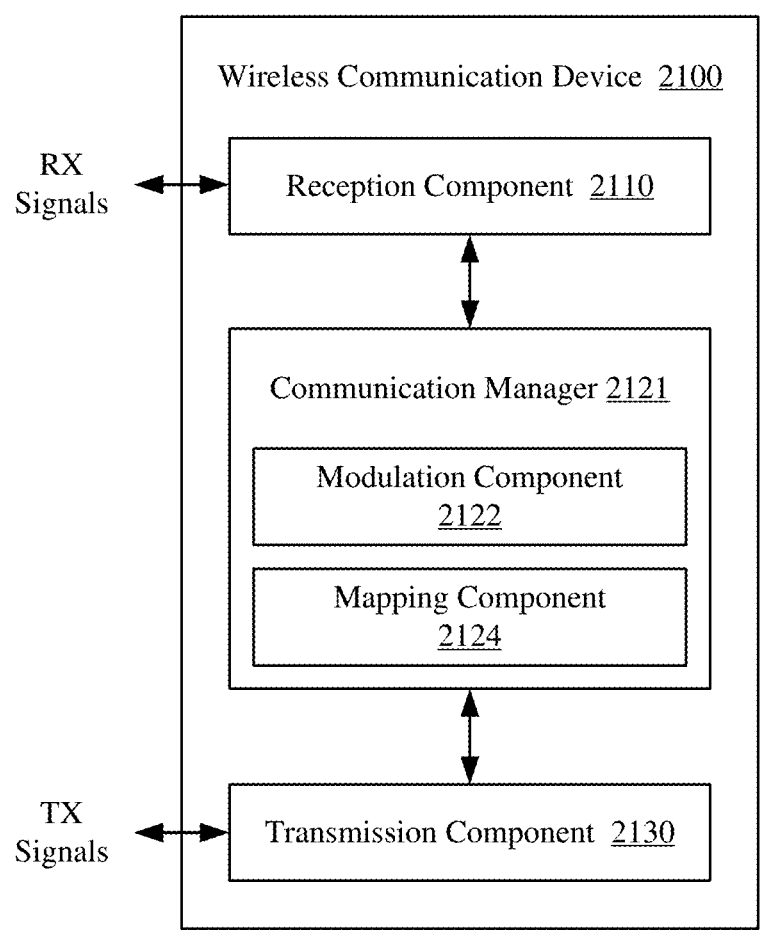
FIG. 21 shows a block diagram of an example wireless communication device according to some implementations.

FIG. 21 shows a block diagram of an example wireless communication device 2100 according to some implementations. In some implementations, the wireless communication device 2100 is configured to perform the process 1900 described above with reference to FIG. 19. The wireless communication device 2100 can be an example implementation of the wireless communication device 400 described above with reference to FIG. 4. For example, the wireless communication device 2100 can be a chip, SoC, chipset, package or device that includes at least one processor and at least one modem (for example, a Wi-Fi (IEEE 802.11) modem or a cellular modem).

The wireless communication device 2100 includes a reception component 2110, a communication manager 2120, and a transmission component 2130. The communication manager 2120 further includes a modulation component 2122 and a mapping component 2124. Portions of one or more of the components 2122 and 2124 may be implemented at least in part in hardware or firmware. In some implementations, at least some of the components 2122 or 2124 are implemented at least in part as software stored in a memory (such as the memory 408). For example, portions of one or more of the components 2122 and 2124 can be implemented as non-transitory instructions (or "code") executable by a processor (such as the processor 406) to perform the functions or operations of the respective component.

The reception component 2110 is configured to receive RX signals, over a wireless channel, from one or more other wireless communication devices. The communication manager 2120 is configured to control or manage communications with one or more other wireless communication devices. In some implementations, the modulation component 2122 may modulate a PPDU on a number (M) of tones representing a logical RU that is associated with a number (K) of pilot tones each having a respective location relative to the M tones; and the mapping component 2124 may map the M tones to M noncontiguous subcarrier indices of a plurality of subcarrier indices spanning a wireless channel, where the M tones mapped to the M noncontiguous subcarrier indices represent a dRU. The transmission component 2130 is configured to transmit TX signals, over a wireless channel, to one or more other wireless communication devices. In some implementations, the transmission component 2130 may transmit, over the wireless channel, the PPDU including a number (N) of pilot tones each having a respective location relative to the M tones as mapped to the M noncontiguous subcarrier indices, where the relative locations of the N pilot tones are different than the relative locations of the K pilot tones.

Figure 22:
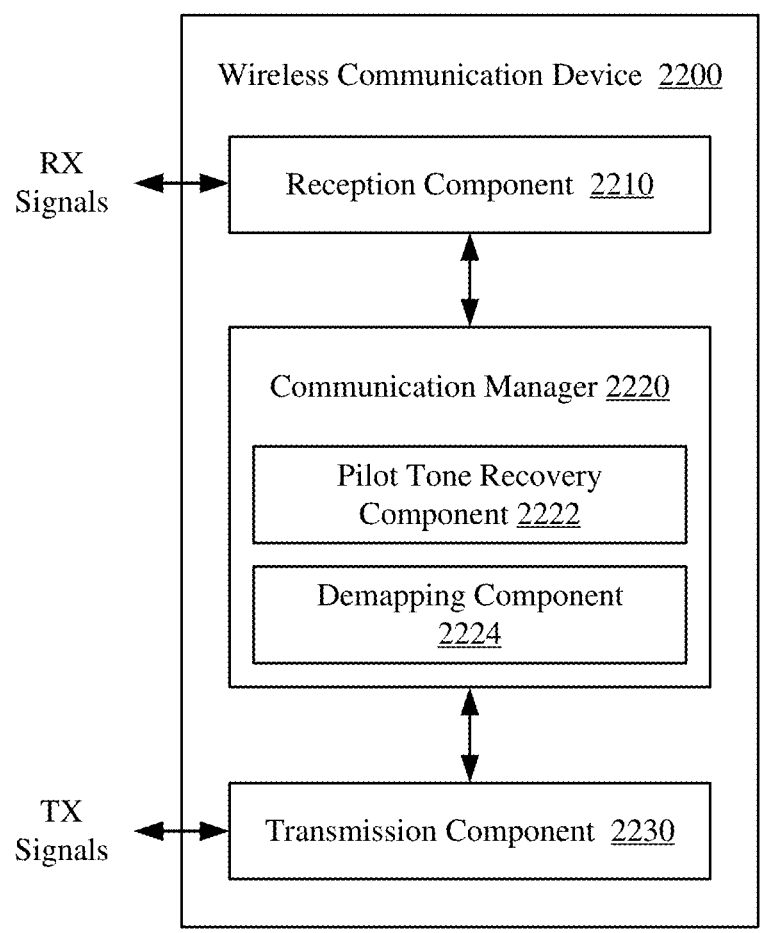
FIG. 22 shows a block diagram of an example wireless communication device according to some implementations.

FIG. 22 shows a block diagram of an example wireless communication device 2200 according to some implementations. In some implementations, the wireless communication device 2200 is configured to perform the process 2000 described above with reference to FIG. 20. The wireless communication device 2200 can be an example implementation of the wireless communication device 400 described above with reference to FIG. 4. For example, the wireless communication device 2200 can be a chip, SoC, chipset, package or device that includes at least one processor and at least one modem (for example, a Wi-Fi (IEEE 802.11) modem or a cellular modem).

The wireless communication device 2200 includes a reception component 2210, a communication manager 2220, and a transmission component 2230. The communication manager 2220 further includes a pilot tone recovery component 2222 and a demapping component 2224. Portions of one or more of the components 2222 and 2224 may be implemented at least in part in hardware or firmware. In some implementations, at least some of the components 2222 or 2224 are implemented at least in part as software stored in a memory (such as the memory 408). For example, portions of one or more of the components 2222 and 2224 can be implemented as non-transitory instructions (or "code") executable by a processor (such as the processor 406) to perform the functions or operations of the respective component.

The reception component 2210 is configured to receive RX signals, over a wireless channel, from one or more other wireless communication devices. In some implementations, the reception component 2210 may receive a PPDU over a wireless channel, where the PPDU is carried on a number (M) of tones mapped to M noncontiguous subcarrier indices of a plurality of subcarrier indices spanning the wireless channel, where the M tones mapped to the M noncontiguous subcarrier indices represent a dRU. The communication manager 2220 is configured to control or manage communications with one or more other wireless communication devices. In some implementations, the pilot tone recovery component 2222 may recover, from the received PPDU, a number (N) of pilot tones each having a respective location relative to the M tones as mapped to the M noncontiguous subcarrier indices; and the demapping component 2224 may demap the M tones from the M noncontiguous subcarrier indices, where the demapped M tones represent a logical RU that is associated with a number (K) of pilot tones each having a respective location relative to the remapped M tones, where the relative locations of the K pilot tones are different than the relative locations of the N pilot tones. The transmission component 2230 is configured to transmit TX signals, over a wireless channel, to one or more other wireless communication devices.

Implementation examples are described in the following numbered clauses:

1. A method for wireless communication by a wireless communication device, including:
   modulating a physical layer convergence protocol (PLCP) protocol data unit (PPDU) on a number (M) of tones representing a logical resource unit (RU) that is associated with a number (K) of pilot tones each having a respective location relative to the M tones;
   mapping the M tones to M noncontiguous subcarrier indices of a plurality of subcarrier indices spanning a wireless channel, the M tones mapped to the M noncontiguous subcarrier indices representing a distributed resource unit (dRU); and
   transmitting, over the wireless channel, the PPDU including a number (N) of pilot tones each having a respective location relative to the M tones as mapped to the M noncontiguous subcarrier indices, the relative locations of the N pilot tones being different than the relative locations of the K pilot tones.

2. The method of clause 1, where N is equal to K.
3. The method of any of clauses 1 or 2, where the N pilot tones carry the same values as the K pilot tones.
4. The method of any of clauses 1–3, where M=26 and the mapping of the M tones to the M noncontiguous subcarrier indices changes the relative locations of the K pilot tones, the N pilot tones representing the K pilot tones as a result of the mapping.
5. The method of any of clauses 1-4, where the mapping of the M tones to the M noncontiguous subcarrier indices shifts the relative locations of the K pilot tones by −3 or +3.
6. The method of clause 1, where N is different than K.
7. The method of any of clauses 1-6, where the relative locations of the N pilot tones are associated with N subcarrier indices of the plurality of subcarrier indices.
8. The method of any of clauses 1-7, where the N subcarrier indices are located symmetrically around a center frequency associated with the wireless channel.
9. The method of any of clauses 1-7, where the N subcarrier indices are located asymmetrically around a center frequency associated with the wireless channel.
10. The method of any of clauses 1-9, where the N subcarrier indices include N/2 equidistant subcarrier indices located above a carrier frequency associated with the wireless channel and include N/2 equidistant subcarrier indices located below the carrier frequency.
11. The method of any of clauses 1-10, where each of the N subcarrier indices represents a respective pilot tone location associated with a 26-tone dRU.
12. The method of any of clauses 1-10, where at least one of the N subcarrier indices represents a pilot tone location that is unique to M-tone dRUs.
13. The method of any of clauses 1-12, where each of the N subcarrier indices is located a respective distance from a starting subcarrier index of the M noncontiguous subcarrier indices based on a location of a starting subcarrier index relative to the wireless channel and a dRU index associated with the dRU.
14. A wireless communication device including:
at least one processor; and
at least one memory communicatively coupled with the at least one processor and storing processor-readable code that, when executed by the at least one processor, is configured to perform the method of any one or more of clauses 1-13.
15. A method for wireless communication performed by a wireless communication device, including:
receiving a physical layer (PHY) convergence protocol (PLCP) protocol data unit (PPDU) over a wireless channel, the PPDU being carried on a number (M) of tones mapped to M noncontiguous subcarrier indices of a plurality of subcarrier indices spanning the wireless channel, the M tones mapped to the M noncontiguous subcarrier indices representing a distributed resource unit (dRU);
recovering, from the received PPDU, a number (N) of pilot tones each having a respective location relative to the M tones as mapped to the M noncontiguous subcarrier indices; and
demapping the M tones from the M noncontiguous subcarrier indices, the demapped M tones representing a logical resource unit (RU) that is associated with a number (K) of pilot tones each having a respective location relative to the demapped M tones, the relative locations of the K pilot tones being different than the relative locations of the N pilot tones.
16. The method of clause 15, where N is equal to K.
17. The method of any of clauses 15 or 16, where the N pilot tones carry the same values as the K pilot tones.
18. The method of any of clauses 15-17, where M=26 and the demapping of the M tones from the M noncontiguous subcarrier indices changes the relative locations of the N pilot tones, the K pilot tones representing the N pilot tones as a result of the demapping.
19. The method of any of clauses 15-18, where the demapping of the M tones from the M noncontiguous subcarrier indices shifts the relative locations of the N pilot tones by −3 or +3.
20. The method of clause 15, where N is different than K.
21. The method of any of clauses 15-20, where the relative locations of the N pilot tones are associated with N subcarrier indices of the plurality of subcarrier indices.
22. The method of any of clauses 15-21, where the N subcarrier indices are located symmetrically around a center frequency associated with the wireless channel.
23. The method of any of clauses 15-21, where the N subcarrier indices are located asymmetrically around a center frequency associated with the wireless channel.
24. The method of any of clauses 15-23, where the N subcarrier indices include N/2 equidistant subcarrier indices located above a carrier frequency associated with the wireless channel and include N/2 equidistant subcarrier indices located below the carrier frequency.
25. The method of any of clauses 15-24, where each of the N subcarrier indices represents a respective pilot tone location associated with a 26-tone dRU.
26. The method of any of clauses 15-24, where at least one of the N subcarrier indices represents a pilot tone location that is unique to M-tone dRUs.
27. The method of any of clauses 15-26, where each of the N subcarrier indices is located a respective distance from a starting subcarrier index of the M noncontiguous subcarrier based on a location of the starting subcarrier index relative to the wireless channel and a dRU index associated with the dRU.
28. A wireless communication device including:
at least one processor; and
at least one memory communicatively coupled with the at least one processor and storing processor-readable code that, when executed by the at least one processor, is configured to perform the method of any one or more of clauses 15-27.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
   modulating a physical layer convergence protocol (PLCP) protocol data unit (PPDU) on a number (M) of tones representing a logical resource unit (RU) that is associated with a number (K) of pilot tones each having a respective location relative to the M tones;
   mapping the M tones to M noncontiguous subcarrier indices of a plurality of subcarrier indices spanning a wireless channel, the M tones mapped to the M noncontiguous subcarrier indices representing a distributed resource unit (dRU); and
   transmitting, over the wireless channel, the PPDU including a number (N) of pilot tones each having a respective location relative to the M tones as mapped to the M noncontiguous subcarrier indices, the relative locations of the N pilot tones being different than the relative locations of the K pilot tones, the relative locations of the N pilot tones being associated with N subcarrier indices of the plurality of subcarrier indices, and each of the N subcarrier indices representing a respective pilot tone location associated with a 26-tone dRU.

2. The method of claim 1, wherein N is equal to K.

3. The method of claim 2, wherein the N pilot tones carry the same values as the K pilot tones.

4. The method of claim 3, wherein M=26 and the mapping of the M tones to the M noncontiguous subcarrier indices changes the relative locations of the K pilot tones, the N pilot tones representing the K pilot tones as a result of the mapping.

5. The method of claim 4, wherein the mapping of the M tones to the M noncontiguous subcarrier indices shifts the relative locations of the K pilot tones by −3 or +3.

6. The method of claim 1, wherein N is different than K.

7. The method of claim 1, wherein the N subcarrier indices are located symmetrically around a center frequency associated with the wireless channel.

8. The method of claim 1, wherein the N subcarrier indices are located asymmetrically around a center frequency associated with the wireless channel.

9. The method of claim 1, wherein the N subcarrier indices include N/2 equidistant subcarrier indices located above a carrier frequency associated with the wireless channel and include N/2 equidistant subcarrier indices located below the carrier frequency.

10. The method of claim 1, wherein at least one of the N subcarrier indices represents a pilot tone location that is unique to M-tone dRUs.

11. The method of claim 1, wherein each of the N subcarrier indices is located a respective distance from a starting subcarrier index of the M noncontiguous subcarrier indices based on a location of a starting subcarrier index relative to the wireless channel and a dRU index associated with the dRU.

12. A wireless communication device comprising:
    at least one processor; and
    at least one memory communicatively coupled with the at least one processor and storing processor-readable code that, when executed by the at least one processor, is configured to:
      modulate a physical layer convergence protocol (PLCP) protocol data unit (PPDU) on a number (M) of tones representing a logical resource unit (RU) that is associated with a number (K) of pilot tones each having a respective location relative to the M tones;
      map the M tones to M noncontiguous subcarrier indices of a plurality of subcarrier indices spanning a wireless channel, the M tones mapped to the M noncontiguous subcarrier indices representing a distributed RU (dRU); and
      transmit, over the wireless channel, the PPDU including a number (N) of pilot tones each having a respective location relative to the M tones, the relative locations of the N pilot tones being different than the relative locations of the K pilot tones, the relative locations of the N pilot tones being associated with N subcarrier indices of the plurality of subcarrier indices that include N/2 equidistant subcarrier indices located above a carrier frequency associated with the wireless channel and include N/2 equidistant subcarrier indices located below the carrier frequency, each of the N subcarrier indices being located a respective distance from a starting subcarrier index of the M noncontiguous subcarrier based on a location of the starting subcarrier index relative to the wireless channel and a dRU index associated with the dRU.

13. A method for wireless communication performed by a wireless communication device, comprising:

receiving a physical layer (PHY) convergence protocol (PLCP) protocol data unit (PPDU) over a wireless channel, the PPDU being carried on a number (M) of tones mapped to M noncontiguous subcarrier indices of a plurality of subcarrier indices spanning the wireless channel, the M tones mapped to the M noncontiguous subcarrier indices representing a distributed resource unit (dRU);

recovering, from the received PPDU, a number (N) of pilot tones each having a respective location relative to the M tones as mapped to the M noncontiguous subcarrier indices; and demapping the M tones from the M noncontiguous subcarrier indices, the demapped M tones representing a logical resource unit (RU) that is associated with a number (K) of pilot tones each having a respective location relative to the demapped M tones, the relative locations of the K pilot tones being different than the relative locations of the N pilot tones, the relative locations of the N pilot tones being associated with N subcarrier indices of the plurality of subcarrier indices, and each of the N subcarrier indices representing a respective pilot tone location associated with a 26-tone dRU.

14. The method of claim 13, wherein N is equal to K.

15. The method of claim 14, wherein the N pilot tones carry the same values as the K pilot tones.

16. The method of claim 15, wherein M=26 and the demapping of the M tones from the M noncontiguous subcarrier indices changes the relative locations of the N pilot tones, the K pilot tones representing the N pilot tones as a result of the demapping.

17. The method of claim 16, wherein the demapping of the M tones from the M noncontiguous subcarrier indices shifts the relative locations of the N pilot tones by −3 or +3.

18. The method of claim 13, wherein N is different than K.

19. The method of claim 13, wherein the N subcarrier indices are located symmetrically around a center frequency associated with the wireless channel.

20. The method of claim 13, wherein the N subcarrier indices are located asymmetrically around a center frequency associated with the wireless channel.

21. The method of claim 13, wherein the N subcarrier indices include N/2 equidistant subcarrier indices located above a carrier frequency associated with the wireless channel and include N/2 equidistant subcarrier indices located below the carrier frequency.

22. The method of claim 13, wherein at least one of the N subcarrier indices represents a pilot tone location that is unique to M-tone dRUs.

23. The method of claim 13, wherein each of the N subcarrier indices is located a respective distance from a starting subcarrier index of the M noncontiguous subcarrier based on a location of the starting subcarrier index relative to the wireless channel and a dRU index associated with the dRU.

24. A wireless communication device comprising:
at least one processor; and
at least one memory communicatively coupled with the at least one processor and storing processor-readable code that, when executed by the at least one processor, is configured to:
receive a physical layer (PHY) convergence protocol (PLCP) protocol data unit (PPDU) over a wireless channel, the PPDU being carried on a number (M) of tones mapped to M noncontiguous subcarrier indices of a plurality of subcarrier indices spanning the wireless channel, the M tones mapped to the M noncontiguous subcarrier indices representing a distributed resource unit (dRU)

recover, from the received PPDU, a number (N) of pilot tones each having a respective location relative to the M tones as mapped to the M noncontiguous subcarrier indices; and demap M tones from the M noncontiguous subcarrier indices, the demapped M tones representing a logical RU that is associated with a number (K) of pilot tones each having a respective location relative to the demapped M tones, the relative locations of the K pilot tones being different than the relative locations of the N pilot tones, the relative locations of the N pilot tones being associated with N subcarrier indices of the plurality of subcarrier indices that include N/2 equidistant subcarrier indices located above a carrier frequency associated with the wireless channel and include N/2 equidistant subcarrier indices located below the carrier frequency, each of the N subcarrier indices being located a respective distance from a starting subcarrier index of the M noncontiguous subcarrier based on a location of the starting subcarrier index relative to the wireless channel and a dRU index associated with the dRU.

* * * * *